(12) United States Patent
Vogel et al.

(10) Patent No.: US 10,047,231 B2
(45) Date of Patent: Aug. 14, 2018

(54) TRIS(HYDROXYPHENYL) TRIAZINES

(75) Inventors: Thomas Vogel, Haltingen (DE); Adalbert Braig, Binzen (DE); Vien Van Toan, Rheinfelden (CH)

(73) Assignee: BASF SE, Ludwigshafen (DE)

( * ) Notice: Subject to any disclaimer, the term of this patent is extended or adjusted under 35 U.S.C. 154(b) by 2551 days.

(21) Appl. No.: 11/921,603

(22) PCT Filed: May 31, 2006

(86) PCT No.: PCT/EP2006/062754
§ 371 (c)(1),
(2), (4) Date: Dec. 5, 2007

(87) PCT Pub. No.: WO2006/131469
PCT Pub. Date: Dec. 14, 2006

(65) Prior Publication Data
US 2009/0117394 A1    May 7, 2009

(30) Foreign Application Priority Data

Jun. 10, 2005  (EP) .................................. 05105109

(51) Int. Cl.
*C09D 5/44* (2006.01)
*C09D 7/48* (2018.01)
*C08K 5/3492* (2006.01)

(52) U.S. Cl.
CPC ............. *C09D 5/4492* (2013.01); *C09D 7/48* (2018.01); *C08K 5/34926* (2013.01); *Y10T 428/31678* (2015.04)

(58) Field of Classification Search
CPC .... C09D 5/4492; C09D 7/48; C08K 5/34926; Y10T 428/31678
See application file for complete search history.

(56) References Cited

U.S. PATENT DOCUMENTS

| | | | | |
|---|---|---|---|---|
| 3,118,887 A | | 1/1964 | Hardy et al. | 260/248 |
| 3,268,474 A | * | 8/1966 | Hardy et al. | 524/100 |
| 3,706,740 A | * | 12/1972 | Dexter | 544/216 |
| 3,905,939 A | * | 9/1975 | Dexter et al. | 524/100 |
| 4,804,581 A | * | 2/1989 | Geary et al. | 428/332 |
| 5,354,794 A | | 10/1994 | Stevenson et al. | |
| 5,369,140 A | * | 11/1994 | Valet et al. | 522/75 |
| 5,476,937 A | | 12/1995 | Stevenson et al. | 544/216 |
| 5,556,973 A | * | 9/1996 | Stevenson et al. | 544/216 |
| 5,674,668 A | | 10/1997 | Hagemann et al. | |
| 5,942,564 A | | 8/1999 | Kaschig et al. | |
| 6,184,375 B1 | * | 2/2001 | Huglin et al. | 544/116 |
| 6,239,275 B1 | * | 5/2001 | Gupta et al. | 544/213 |
| 7,553,892 B2 | * | 6/2009 | Negishi et al. | 524/100 |

FOREIGN PATENT DOCUMENTS

| | | |
|---|---|---|
| EP | 0941989 | 9/1999 |
| GB | 975966 | 11/1964 |
| GB | 1294322 | 10/1972 |
| JP | 5-25029 | 2/1993 |
| JP | 05025029 | 2/1993 |
| JP | 8-501291 | 2/1996 |
| JP | 8-506608 | 7/1996 |
| JP | 9-106039 | 4/1997 |
| JP | 11-71355 | 3/1999 |
| JP | 11-71356 | 3/1999 |
| JP | 2001-277720 | 10/2001 |
| JP | 2001277720 | 10/2001 |
| WO | 94/05645 | 3/1994 |
| WO | 99/67223 | 12/1999 |
| WO | 00/29392 | 5/2000 |

OTHER PUBLICATIONS

EIC structure search; Aug. 6, 2012.*
Patent Abstracts of Japan Publication No. 05025029, Feb. 2, 1993.
Patent Abstracts of Japan Publication No. 2001277720, Oct. 10, 2001.
Chem. Abstract 81:152177 for Y. Horikoshi et al., Nippon Kagaku Kaishi, (1974), vol. 3, pp. 530-535.
Machine translation of JP 11-71356 (1999).
Machine translation of JP 11-71355 (1999).
Machine translation of JP 5-25029 (1993).
Machine translation of JP 2001-277720 (2001).
Chem. Abstract 135:296246 for N. Saito et al., Fuji Photo Film Co., Ltd., (2001), p. 16.
Chem. Abstract 118:240480 for M. Sudo et al., Daikyo Gomu Seiko Kk, (1993), p. 11.

* cited by examiner

*Primary Examiner* — Kevin R Kruer
(74) *Attorney, Agent, or Firm* — Marshall, Gerstein & Borun LLP

(57) ABSTRACT

The instant invention relates to novel tris(hydroxyphenyl) triazines coating compositions, for instance automotive coating compositions, and to novel tris(hydroxyphenyl) triazines UV-absorbers having a long wavelength sifted absorption spectrum with significant absorbance up to 420 nm. Further aspects of the invention are a UV stabilized composition containing the novel UV-absorbers, a process for the stabilization of organic materials and coatings and the use of the compounds as UV-light stabilizers for organic materials and coatings.

11 Claims, No Drawings

TRIS(HYDROXYPHENYL) TRIAZINES

This application is a National Stage of International Application PCT/EP2006/062754, filed May 31, 2006, which in turn claims priority to EP 05105109.2, filed Jun. 10, 2005.

FIELD OF THE INVENTION

The instant invention relates to novel tris(hydroxyphenyl) triazines coating compositions, for instance automotive coating compositions, and to novel tris(hydroxyphenyl) triazines UV-absorbers having a long wavelength shifted absorption spectrum with significant absorbance up to 420 nm. Further aspects of the invention are a UV stabilized composition containing the novel UV-absorbers, a process for the stabilization of organic materials and coatings and the use of the compounds as UV-light stabilizers for organic materials and coatings.

BACKGROUND OF THE INVENTION

Polymeric substrates containing aromatic moieties, such as for example adhesives or coating resins based on aromatic epoxides, aromatic polyesters or aromatic (poly-) isocyanates are highly sensitive to UV/VIS radiation up to wavelengths of approximately 420 nm.

The protection of such adhesive or coating layers with a UV absorbing layer on top is extremely difficult, since already very small amounts of radiation—even in the range of around 410 nm—penetrating the UV absorbing top coating are sufficient to cause delamination and peeling off of the protective coating.

Typical applications, in which long wavelength shifted UV absorbers are extremely useful, are automotive coatings.

Today's automotive coatings have applied an anticorrosive cathodic electro coat directly on the steel plate. Due to the significantly red shifted light sensitivity of the cathodic resins (up to approximately 400-420 nm) it is not possible to protect the cathodic electro coat with conventional prior art UV-absorbers in the top coatings adequately.

In order to better protect such sensitive layers, attempts have been made to shift the UV absorption of triazines towards longer wavelengths. For example, U.S. Pat. No. 5,354,794, U.S. Pat. No. 5,476,937 and U.S. Pat. No. 5,556,973 describe red-shifted hydroxyphenyl triazines.

A few tris(hydroxyphenyl) triazines are described in CAN 81:152177, CAN 118:240480, CAN 135:296246, EP 762197 A, GB 975966 and WO 94/05645 and transition metal complexes of such triazines are described in GB 1294322.

However, the instant compounds may absorb a greater amount of light up to 420-450 nm, in particular up to 420 nm, than the state of the art. The compounds remain unexpectedly photochemically stable and show virtually no migration in typical coating applications.

SUMMARY OF THE INVENTION

An aspect of the invention is a coating composition, preferably an automotive coating composition, comprising a compound of formula (I)

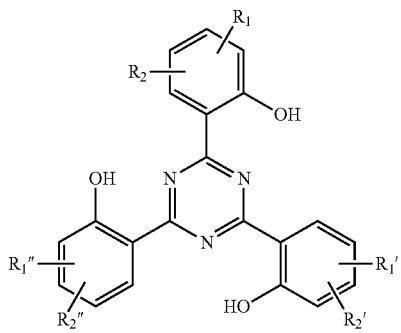

(I)

wherein
$R_1$, $R_1'$ and $R_1''$ are independently hydrogen, $C_1$-$C_{24}$alkyl, $C_2$-$C_{18}$alkenyl, $C_5$-$C_{12}$cycloalkyl, $C_7$-$C_{15}$-phenylalkyl, or said phenylalkyl is substituted on the phenyl ring by 1 to 3 $C_1$-$C_4$alkyl;
$R_2$, $R_2'$ and $R_2''$ are independently $C_1$-$C_{24}$alkyl, which is unsubstituted or substituted by one or more —OH, —COO—$R_{14}$, —OCO—$R_{11}$, —OR$_{14}$, —NCO and/or —NH$_2$ groups; or $C_2$-$C_{18}$alkenyl; or $C_1$-$C_{24}$alkyl or said alkenyl is interrupted by one or more —O—, —NH— and/or —NR$_{14}$— groups and is unsubstituted or substituted by one or more —OH, —OR$_{14}$ and/or —NH$_2$ groups; or $C_5$-$C_{12}$cycloalkyl, phenyl or $C_7$-$C_{15}$-phenylalkyl, or said phenyl or said phenylalkyl is substituted on the phenyl ring by 1 to 3 $C_1$-$C_4$alkyl; or —C(O)—O—$R_{14}$, —C(O)—NHR$_{14}$, —C(O)—NR$_{14}$R$_{14}'$ or —(CH$_2$)$_m$—CO—X$_1$—(Z)—Y—$R_{15}$;
$R_{11}$ is hydrogen, $C_1$-$C_{18}$alkyl, $C_5$-$C_{12}$cycloalkyl, $C_3$-$C_8$alkenyl, phenyl, naphthyl or $C_7$-$C_{15}$-phenylalkyl;
$R_{14}$ is $C_1$-$C_{24}$alkyl;
$R_{14}'$ is as defined for $R_{14}$;
$X_1$ is —O— or —N(R$_{16}$)—;
Y is —O— or —N(R$_{17}$)— or a direct bond;
Z is $C_2$-$C_{12}$-alkylene, $C_4$-$C_{12}$alkylene interrupted by one to three N(R$_{20}$) and/or oxygen atoms, or is $C_3$-$C_{12}$alkenylene, butynylene, cyclohexylene or phenylene, each of which is unsubstituted or substituted by a hydroxyl group;
or is a group

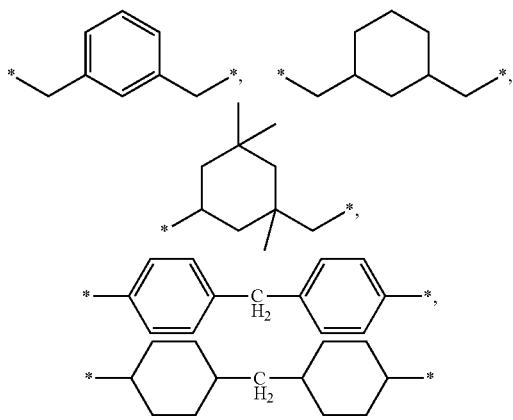

wherein * denotes a bond
or when Y is a direct bond, Z can additionally also be a direct bond;
m is zero, 1 or 2;

$R_{15}$ is hydrogen, $C_1$-$C_{12}$alkyl, or a group —CO—C($R_{18}$)=C(H)$R_{19}$ or, when Y is —N($R_{17}$)—, forms together with $R_{17}$ a group —CO—CH=CH—CO—;

$R_{16}$ and $R_{17}$ independently of one another are hydrogen, $C_1$-$C_{12}$alkyl, $C_3$-$C_{12}$alkyl interrupted by 1 to 3 oxygen atoms, or is cyclohexyl or $C_7$-$C_{15}$-phenylalkyl, and $R_{16}$ together with $R_{17}$ in the case where Z is ethylene, also forms ethylene;

$R_{18}$ is hydrogen or methyl;

$R_{19}$ is hydrogen, methyl or —CO—$X_1$—$R_{20}$; and $R_{20}$ is hydrogen or $C_1$-$C_{12}$alkyl.

When any of the substituents are alkyl, they can be straight or branched chain alkyl, said alkyl comprises within the limits of carbon atoms given, for example, methyl, ethyl, isopropyl, n-butyl, isobutyl, sec-butyl, tert-butyl, tert-amyl, 2-ethylhexyl, tert-octyl, lauryl, tert-dodecyl, tridecyl, n-hexadecyl, n-octadecyl or eicosyl.

When any of said substituents are alkenyl, which are straight or branched chain alkenyl, such groups are within the limits of carbon atoms given, for example, allyl, pentenyl, hexenyl, doceneyl or oleyl.

In case of $C_2$-$C_{18}$alkenyl, preference is given to $C_3$-$C_{16}$alkenyl, especially $C_3$-$C_{12}$alkenyl, for example $C_2$-$C_6$alkenyl.

When any of said substituents are cycloalkyl of 5 to 12 carbon atoms, such groups are, for example, cyclopentyl, cyclohexyl, cycloheptyl, cyclooctyl or cyclododecyl.

When any of said radicals are phenylalkyl of 7 to 15 carbon atoms, such groups are, for example, benzyl, phenethyl, α-methylbenzyl or α,α-dimethylbenzyl.

When phenyl is substituted by 1-3 alkyl, for instance 1-2 alkyl, this is, for example, tolyl or xylyl.

Alkyl interrupted by one or more —O— groups and is unsubstituted or substituted by one or more —OH can, for example, be —(OCH$_2$CH$_2$)$_w$OH or —(OCH$_2$CH$_2$)$_w$O(C$_1$-C$_{22}$alkyl) where w is 1 to 12.

Alkyl interrupted by one or more —O— can be derived from ethylenoxide units or from propyleneoxide units or from mixtures of both.

When alkyl is interrupted by —NH— or —NR$_{14}$— the radicals are derived in analogy to the above —O— interrupted radicals. Preferred are repeating units of ethylenediamine.

When alkenyl is interrupted by —O—, —NH— or —NR$_{14}$— the radicals are derived in analogy to the above —O— interrupted alkyl.

Examples of such interrupted groups are CH$_3$—O—CH$_2$CH$_2$—, CH$_3$—NH—CH$_2$CH$_2$—, CH$_3$—N(CH$_3$)—CH$_2$—, CH$_3$—O—CH$_2$CH$_2$—O—CH$_2$CH$_2$—, CH$_3$—(O—CH$_2$CH$_2$—)$_2$O—CH$_2$CH$_2$—, CH$_3$—(O—CH$_2$CH$_2$—)$_3$O—CH$_2$CH$_2$— and CH$_3$—(O—CH$_2$CH$_2$—)$_4$O—CH$_2$CH$_2$—.

Alkylene is, for example, ethylene, tetramethylene, hexamethylene, 2-methyl-1,4-tetramethylene, hexamethylene, octamethylene, decamethylene or dodecamethylene.

Alkylene interrupted by oxygen or —NR$_{20}$— is, for example, —CH$_2$CH$_2$—O—CH$_2$CH$_2$—, —CH$_2$CH$_2$—NH—CH$_2$CH$_2$—, —CH$_2$CH$_2$—N(CH$_3$)—CH$_2$CH$_2$—, —CH$_2$CH$_2$—O—CH$_2$CH$_2$—O—CH$_2$CH$_2$—, —CH$_2$CH$_2$—(O—CH$_2$CH$_2$—)$_2$O—CH$_2$CH$_2$—, —CH$_2$CH$_2$—(O—CH$_2$CH$_2$—)$_3$O—CH$_2$CH$_2$—, —CH$_2$CH$_2$—(O—CH$_2$CH$_2$—)$_4$O—CH$_2$CH$_2$— or —CH$_2$CH$_2$—NH—CH$_2$CH$_2$—.

When any of said substituents are alkenylene, which are straight or branched chain alkenylene, such groups are, for example, allylene, pentenylene, hexenylene or docenylene.

DETAILED DESCRIPTION OF THE INVENTION

The instant compounds and their starting materials may be prepared by methods known in the art.

For example, the tris(hydroxyphenyl) triazines are prepared as described in EP 0648753 A and the literature cited therein, i.e. by reacting o-hydroxybenzonitriles.

The reaction time is usually 2 to 24 hours, preferably 2 to 6 hours. Solvents and further additives are not necessary for the reaction. The use of catalysts can also be dispensed with.

The preferred reaction temperature is in the range from 180° to 260° C., especially from 180° to 230° C.

The reaction is usually carried out such that the o-hydroxybenzonitriles are brought together, with stirring, then heated until the reactants are completely fused, and further stirred at this temperature during the indicated reaction time.

For instance, the tris(hydroxyphenyl) triazines can be prepared by Friedel-Crafts reaction between halotriazines and phenols analogously to one of the methods specified in EP-A-434 608 or in one of the publications mentioned at the beginning or analogously to one of the methods specified in the publication by H. Brunetti and C. E. Lüthi, Helv. Chim. Acta 55, 1566 (1972); see also U.S. Pat. Nos. 5,726,310, 6,057,444, 6,225,468, EP-A-941 989 and WO 00/29392.

To prepare the tris(hydroxyphenyl) triazines, advantageously one equivalent of cyanuric chloride is used as starting material and is reacted with approximately three equivalent of phenols (one to three different phenols), such as, for example, tert-butyl phenol, preferably three equivalents of the same phenol. Suitable phenols must have at least one C—H bond, preferably three or four C—H bonds, especially three C—H bonds, on the aromatic compound; all of the phenols used must contain an ortho-position unsubstituted in that manner. The phenol is preferably phenol substituted by one or two alkyl or by one or two phenylalkyl, especially methyl phenol, tert-butyl phenol, di(tert-butyl) phenol or tert-butyl methyl phenol.

The reaction is carried out in a manner known per se by reacting the starting materials with the cyanuric halide in an inert solvent in the presence of anhydrous AlCl$_3$. Aluminium trichloride can be used in excess and/or in admixture with HCl, for example conc. aqu. hydrochloric acid.

Suitable solvents are, for example, hydrocarbons, chlorinated hydrocarbons, hydrocarbons containing SO or SO$_2$ groups, or nitrated aromatic hydrocarbons; high-boiling hydrocarbons, such as ligroin, petroleum ether, toluene or xylene, or sulfolane are preferred.

The temperature is generally not critical; the temperatures used are usually from −20° C. to the boiling point of the solvent, for example from 0° C. to 100° C.

The products from the above-described reactions can be further modified within the scope of the definitions given for formula (I) according to known methods.

The reactions can be carried out with the exclusion of oxygen, for example by flushing with an inert gas, such as argon; oxygen is not troublesome in every case, however, and therefore the reaction can also be carried out without the mentioned measure. When the reaction is complete, working-up can be carried out according to customary methods.

Of interest is a coating composition, preferably an automotive coating composition, wherein $R_1$, $R_1'$ and $R_1''$ are independently hydrogen, $C_1$-$C_{24}$alkyl, $C_2$-$C_{18}$alkenyl, $C_5$-$C_{12}$cycloalkyl, $C_7$-$C_{15}$-phenylalkyl, or said phenylalkyl is substituted on the phenyl ring by 1 to 3 $C_1$-$C_4$alkyl;

$R_2$, $R_2'$ and $R_2''$ are independently $C_1$-$C_{24}$alkyl, which is unsubstituted or substituted by one or more —OH, —COO—$R_{14}$, —OCO—$R_{11}$, —O$R_{14}$, —NCO and/or —NH$_2$ groups; or $C_2$-$C_{18}$alkenyl; or $C_1$-$C_{24}$alkyl or said alkenyl is interrupted by one or more —O—, —NH— and/or —N$R_{14}$— groups and is unsubstituted or substituted by one or more —OH, —O$R_{14}$ and/or —NH$_2$ groups; or $C_5$-$C_{12}$cycloalkyl, phenyl or $C_7$-$C_{15}$-phenylalkyl, or said phenyl or said phenylalkyl is substituted on the phenyl ring by 1 to 3 $C_1$-$C_4$alkyl;

$R_{11}$ is hydrogen, $C_1$-$C_{18}$alkyl, $C_5$-$C_{12}$cycloalkyl, $C_3$-$C_8$alkenyl, phenyl, naphthyl or $C_7$-$C_{15}$-phenylalkyl; and $R_{14}$ is $C_1$-$C_{24}$alkyl.

Also of interest is a coating composition, preferably an automotive coating composition, wherein $R_1$, $R_1'$ and $R_1''$ are independently hydrogen, $C_1$-$C_{24}$alkyl, $C_2$-$C_{18}$alkenyl, $C_5$-$C_{12}$cycloalkyl, $C_7$-$C_{15}$-phenylalkyl, or said phenylalkyl substituted on the phenyl ring by 1 to 3 $C_1$-$C_4$alkyl;

$R_2$, $R_2'$ and $R_2''$ are independently $C_1$-$C_{24}$alkyl, $C_2$-$C_{18}$alkenyl, $C_5$-$C_{12}$cycloalkyl, phenyl or $C_7$-$C_{15}$-phenylalkyl, or said phenyl or said phenylalkyl substituted on the phenyl ring by 1 to 3 $C_1$-$C_4$alkyl; or —(CH$_2$)$_2$—CO—$X_1$—(Z)—Y—$R_{15}$;

$X_1$ is —O—;
Y is —O— or a direct bond;
Z is $C_2$-$C_{12}$-alkylene, $C_4$-$C_{12}$alkylene interrupted by one to three N($R_{20}$) and/or oxygen atoms, or when Y is a direct bond, Z can additionally also be a direct bond; and
$R_{15}$ and $R_{20}$ are independently hydrogen or $C_1$-$C_{12}$alkyl.

An example is a coating composition, preferably an automotive coating composition, wherein the compound of formula (I) corresponds to formula (IIa) or (IIb), preferably formula (IIa),

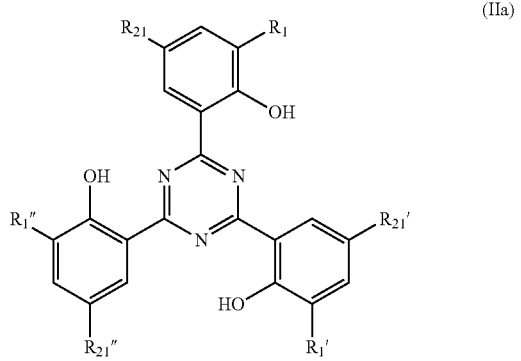

(IIa)

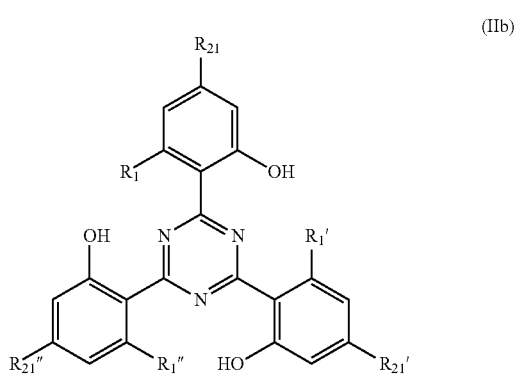

(IIb)

wherein
$R_{21}$ is hydrogen or as defined for $R_2$;
$R_{21}'$ is hydrogen or as defined for $R_2'$;
$R_{21}''$ is hydrogen or as defined for $R_2''$; and
$R_1$, $R_1'$, $R_1''$, $R_2$, $R_2'$ and $R_2''$ are as defined above;
with the proviso that each phenol ring bears at least one substituent $R_1$ and $R_{21}$, $R_1'$ and $R_{21}''$, $R_1''$ and $R_{21}''$ respectively that is not hydrogen.

Of more interest is a coating composition, preferably an automotive coating composition, wherein
$R_1$, $R_1'$ and $R_1''$ are independently hydrogen, $C_1$-$C_{24}$alkyl, $C_2$-$C_{18}$alkenyl, $C_5$-$C_{12}$cycloalkyl, $C_7$-$C_{15}$-phenylalkyl, or said phenylalkyl substituted on the phenyl ring by 1 to 3 $C_1$-$C_4$alkyl;

$R_2$, $R_2'$ and $R_2''$ are independently $C_1$-$C_{24}$alkyl, $C_2$-$C_{18}$alkenyl, $C_5$-$C_{12}$cycloalkyl, phenyl or $C_7$-$C_{15}$-phenylalkyl, or said phenyl or said phenylalkyl substituted on the phenyl ring by 1 to 3 $C_1$-$C_4$alkyl; or —(CH$_2$)$_2$—CO—O—(Z)—O—$R_{15}$;

Z is $C_2$-$C_{12}$-alkylene or $C_4$-$C_{12}$alkylene interrupted by one to three oxygen atoms; and $R_{15}$ is hydrogen or $C_1$-$C_{12}$alkyl.

Of even more interest is a coating composition, preferably an automotive coating composition, wherein
$R_1$, $R_1'$ and $R_1''$ are independently hydrogen, $C_1$-$C_{12}$alkyl or $C_7$-$C_{15}$-phenylalkyl; and
$R_2$, $R_2'$ and $R_2''$ are independently $C_1$-$C_{12}$alkyl, phenyl or $C_7$-$C_{15}$-phenylalkyl, or said phenyl or said phenylalkyl substituted on the phenyl ring by 1 to 3 $C_1$-$C_4$alkyl.

Of utmost interest is a coating composition, preferably an automotive coating composition, wherein
$R_1$, $R_1'$ and $R_1''$ are independently hydrogen or $C_1$-$C_{12}$alkyl; and
$R_2$, $R_2'$ and $R_2''$ are independently $C_1$-$C_{12}$alkyl.

Another example is a coating composition, preferably an automotive coating composition, wherein
none of the substituents $R_1$, $R_1'$, $R_1''$, $R_2$, $R_2'$ and $R_2''$ is hydrogen.

A further example is a coating composition, preferably an automotive coating composition, wherein
if $R_1$, $R_1'$ and $R_1''$ are hydrogen,
$R_2$, $R_2'$ and $R_2''$ are independently $C_1$-$C_{24}$alkyl, which is substituted by one or more —COO—$R_{14}$, —OCO—$R_{11}$, —O$R_{14}$, —NCO and/or —NH$_2$ groups; or $C_2$-$C_{18}$alkenyl; or $C_1$-$C_{24}$alkyl is interrupted by one or more —O—, —NH— and/or —N$R_{14}$— groups and is unsubstituted or substituted by one or more —O$R_{14}$ and/or —NH$_2$ groups; or said alkenyl is interrupted by one or more —O—, —NH— and/or —N$R_{14}$— groups and is unsubstituted or substituted by one or more —OH, —O$R_{14}$ and/or —NH$_2$ groups; or $C_5$-$C_{12}$cycloalkyl; or —C(O)—NH$R_{14}$, —C(O)—N$R_{14}R_{14}'$ or —(CH$_2$)$_m$—CO—$X_1$—(Z)—Y—$R_{15}$; and m is 1 or 2; and
the other groups are as defined above.

Of interest is a compound of formula (I) that is not

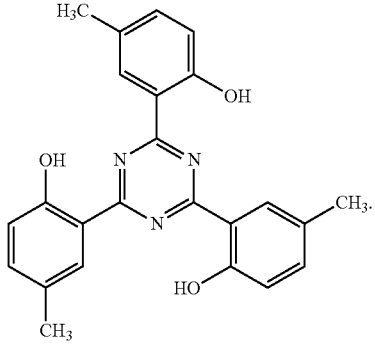 [SMILES: Cc1ccc(O)c(-c2nc(-c3cc(C)ccc3O)nc(-c3cc(C)ccc3O)n2)c1]

Of interest are substituents $R_1$, $R_1'$, $R_1''$, $R_2$, $R_2'$ and $R_2''$, wherein at least one of these substituents is neither hydrogen nor methyl, preferably neither hydrogen nor methyl nor ethyl.

Also of interest are substituents $R_1$, $R_1'$, $R_1''$, $R_{21}$, $R_{21}'$ and $R_{21}''$, wherein at least one of these substituents is neither hydrogen nor methyl, preferably neither hydrogen nor methyl nor ethyl.

Of particular interest are substituents $R_1$ and $R_2$, $R_1'$ and $R_2'$, $R_1''$ and $R_2''$ respectively wherein at least one substituent of each pair is neither hydrogen nor methyl, preferably neither hydrogen nor methyl nor ethyl.

Also of particular interest are substituents $R_1$ and $R_{21}$, $R_1'$ and $R_{21}'$, $R_1''$ and $R_{21}''$ respectively wherein at least one substituent of each pair is neither hydrogen nor methyl, preferably neither hydrogen nor methyl nor ethyl.

Preference is given to a coating composition, preferably an automotive coating composition, wherein the compound of formula (I) is not part of a Ni, Co, Zn, Cd or Cu complex, for instance not part of a transition metal complex, especially not part of a metal complex. Such complexes of Ni, Co, Zn, Cd or Cu are described in GB 1294322.

For instance in the instant coating composition, preferably an automotive coating composition, the compound of formula (I) is present in an amount of from 0.1% to 30% by weight, preferably from 0.5% to 15% and most preferably from 1% to 10% by weight, based on the weight of the coating composition.

Another aspect of the instant invention is a coating, preferably an automotive coating, obtained by applying a coating composition, preferably an automotive coating composition, as defined above on a substrate.

Such substrates are for example glass, metal, wood, plastic or ceramic materials, especially metal. Or such a substrate is another coating, preferably another automotive coating.

Most preferably, the automotive coating comprises the following layers
(d) a cathodically deposited coating, adhering to a metal substrate;
(e) at least one subsequent coating layer containing a compound of formula (I) as defined above adhering to the cathodically deposited coating; and
(f) a clear top coating containing one or more UV-absorbers different from those of formula (I) and optionally further light stabilizers.

For instance, the coating layer e) is directly next to the coating layer d) and the coating layer f) is directly next to the coating layer e).

For example, in such an automotive coating, the metal substrate is pretreated in e.g. a customary zinc phosphate bath.

For instance, the coating, preferably automotive coating, is applied over a substrate, which is sensitive to electromagnetic radiation of wavelengths greater than 380 nm.

A typical sensitive substrate is, for example, a cathodically deposited coating adhering to a metal substrate. Such coatings are typically used in the automotive industry.

Under sensitive to electromagnetic radiation of wavelengths greater than 380 nm there is understood UV or visible light, for example, in the wavelength range up to 450 nm, preferably up to 440 nm and in particular up to 420 nm.

Resins used in coatings, preferably automotive coatings, are typically crosslinked polymers, for example, derived from aldehydes on the one hand and phenols, ureas and melamines on the other hand, such as phenol/formaldehyde resins, urea/formaldehyde resins and melamine/formaldehyde resins.

Also useful are unsaturated polyester resins derived from copolyesters of saturated and unsaturated dicarboxylic acids with polyhydric alcohols and vinyl compounds as crosslinking agents, and also halogen-containing modifications thereof of low flammability.

Preferably used are crosslinkable acrylic resins derived from substituted acrylates, for example epoxy acrylates, urethane acrylates or polyester acrylates.

Also possible are alkyd resins, polyester resins and acrylate resins crosslinked with melamine resins, urea resins, isocyanates, isocyanurates, polyisocyanates or epoxy resins.

Crosslinked epoxy resins derived from aliphatic, cycloaliphatic, heterocyclic or aromatic glycidyl compounds, e.g. products of diglycidyl ethers of bisphenol A and bisphenol F, which are crosslinked with customary hardeners such as anhydrides or amines, with or without accelerators.

The coating material may also be a radiation curable composition containing ethylenically unsaturated monomers or oligomers and a polyunsaturated aliphatic oligomer.

The alkyd resin lacquers which can be stabilized against the action of light in accordance with the instant invention are the conventional stoving lacquers which are used in particular for coating automobiles (automobile finishing lacquers), for example lacquers based on alkyd/melamine resins and alkyd/acrylic/melamine resins (see H. Wagner and H. F. Sarx, "Lackkunstharze" (1977), pages 99-123). Other crosslinking agents include glycouril resins, blocked isocyanates or epoxy resins.

It is also to be noted that the compounds of the present invention are applicable for use in non-acid catalyzed thermoset resins such as epoxy, epoxy-polyester, vinyl, alkyd, acrylic and polyester resins, optionally modified with silicon, isocyanates or isocyanurates. The epoxy and epoxy-polyester resins are crosslinked with conventional crosslinkers such as acids, acid anhydrides, amines and the like. Correspondingly, the epoxide may be utilized as the crosslinking agent for various acrylic or polyester resin systems that have been modified by the presence of reactive groups on the backbone structure.

When water-soluble, water miscible or water dispersible coatings are desired, ammonium salts of acid groups present in the resin are formed. Powder coating composition can be prepared by reacting glycidyl methacrylate with selected alcohol components.

A further aspect of the instant invention is a process for the stabilization of a coating, preferably an automotive coating, against the deleterious influence of UV and/or visible light, which comprises admixing and/or applying to said coating as stabilizer a compound of formula (I) as defined above.

Most preference is given to a process wherein the automotive coating comprises
(g) applying a cathodically deposited coating, adhering to a metal substrate
(h) incorporating into at least one coating adhering to the cathodically deposited coating a compound of formula (I) as defined above; and
(j) applying a clear top coating over the coating adhering to the cathodically deposited coating, which clear top coating contains one or more UV-absorbers different from those of formula (I) and optionally further light stabilizers.

For instance, the coating layer (h) is directly next to the coating layer (g) and the coating layer (j) is directly next to the coating layer (h).

Another aspect of this invention is the use of a compound of formula (I) as defined above as ultraviolet (UV) and visible (VIS) light absorber in a coating, especially in an automotive coating.

Another aspect of the instant invention is a compound (1) which is of formula (I) as defined herein,
wherein
if $R_1$, $R_1'$ and $R_1''$ are hydrogen,
$R_2$, $R_2'$ and $R_2''$ are independently $C_1$-$C_{24}$alkyl, which is substituted by one or more —COO—$R_{14}$, —OCO—$R_{11}$, —OR$_{14}$, —NCO and/or —NH$_2$ groups; or $C_2$-$C_{18}$alkenyl; or $C_1$-$C_{24}$alkyl is interrupted by one or more —O—, —NH— and/or —NR$_{14}$— groups and is unsubstituted or substituted by one or more —OR$_{14}$ and/or —NH$_2$ groups; or said alkenyl is interrupted by one or more —O—, —NH— and/or —NR$_{14}$— groups and is unsubstituted or substituted by one or more —OH, —OR$_{14}$ and/or —NH$_2$ groups; or $C_5$-$C_{12}$cycloalkyl; or —C(O)—NHR$_{14}$, —C(O)—NR$_{14}$R$_{14}'$ or —(CH$_2$)$_m$—CO—X$_1$—(Z)—Y—R$_{15}$; and m is 1 or 2; and
the other groups are as defined above.

Formula (I) is

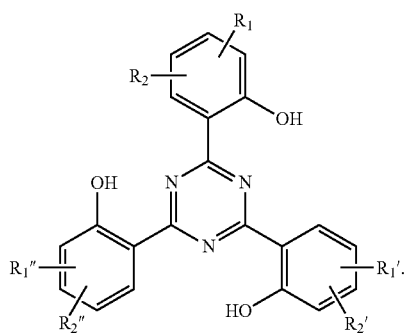

Preference is given to a compound (1), wherein none of the substituents $R_1$, $R_1'$, $R_1''$, $R_2$, $R_2'$ and $R_2''$ is hydrogen.

Further preferences for compound (1) are such as given above for the compound of formula (I) in the coating composition.

Another aspect of the instant invention is a composition stabilized against light-induced degradation which comprises,
(a) an organic material subject to light-induced degradation, and
(b) a compound (1).

For example, the composition comprises further additives.

Examples of further additives are subsequently given.

1. Antioxidants
1.1. Alkylated monophenols, for example 2,6-di-tert-butyl-4-methylphenol, 2-tert-butyl-4,6-di-methylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethyl phenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl) adipate.

1.4. Tocopherols, for example α-tocopherol, β-tocopherol, γ-tocopherol, δ-tocopherol and mixtures thereof (vitamin E).

1.5. Hydroxylated thiodiphenyl ethers, for example 2,2'-thiobis(6-tert-butyl-4-methylphenol), 2,2'-thiobis(4-octyl phenol), 4,4'-thiobis(6-tert-butyl-3-methyl phenol), 4,4'-thiobis(6-tert-butyl-2-methylphenol), 4,4'-thiobis(3,6-di-sec-amylphenol), 4,4'-bis(2,6-dimethyl-4-hydroxyphenyl)-disulfide.

1.6. Alkylidenebisphenols, for example 2,2'-methylenebis (6-tert-butyl-4-methylphenol), 2,2'-methylenebis(6-tert-butyl-4-ethylphenol), 2,2'-methylenebis[4-methyl-6-(α-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butyl-phenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl) butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3, 5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecylmercaptobutane, 1,1, 5,5-tetra-(5-tert-butyl-4-hydroxy-2-methylphenyl)pentane.

1.7. O—, N- and S-benzyl compounds, for example 3,5,3', 5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.8. Hydroxybenzylated malonates, for example dioctadecyl-2,2-bis(3,5-di-tert-butyl-2-hydroxybenzyl)malonate, di-octadecyl-2-(3-tert-butyl-4-hydroxy-5-methylbenzyl)malonate, di-dodecylmercaptoethyl-2,2-bis(3,5-di-tert-butyl-4-hydroxybenzyl)malonate, bis[4-(1,1,3,3-tetramethylbutyl) phenyl]-2,2-bis(3,5-di-tert-butyl-4-hydroxybenzyl) malonate.

1.9. Aromatic hydroxybenzyl compounds, for example 1,3, 5-tris(3,5-di-tert-butyl-4-hydroxy-benzyl)-2,4,6-trimethylbenzene, 1,4-bis(3,5-di-tert-butyl-4-hydroxybenzyl)-2,3,5, 6-tetramethylbenzene, 2,4,6-tris(3,5-di-tert-butyl-4-hydroxybenzyl)phenol.

1.10. Triazine compounds, for example 2,4-bis(octylmercapto)-6-(3,5-di-tert-butyl-4-hydroxy-anilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris-(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris-(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl) propionic acid with mono- or poly-hydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis-(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane; 3,9-bis[2-{3-(3-tert-butyl-4-hydroxy-5-methylphenyl)propionyloxy}-1,1-dimethylethyl]-2,4,8,10-tetraoxaspiro[5.5]-undecane.

1.15. Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl)propionic acid e.g. N,N'-bis(3,5-di-tert-butyl-4-hydroxyphenyl-propionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard® XL-1, supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyidiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylamino-methylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyidiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octyl-phenothiazines, N-allylphenothiazine, N,N,N',N'-tetraphenyl-1,4-diaminobut-2-ene.

2. UV absorbers and light stabilizers 2.1. Benzotriazoles, for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-(α,α-dimethylbenzyl)-2'-hydroxyphenyl)benzotriazole, 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxy-phenyl]-2H-benzotriazole with polyethylene glycol 300;

where R=3'-tert-butyl-4'-hydroxy-5'-2H-benzotriazol-2-yl-phenyl, 2-[2'-hydroxy-3'-(α,α-dimethylbenzyl)-5'-(1,1,3,3-tetramethylbutyl)-phenyl]-benzotriazole; 2-[2'-hydroxy-3'-(1,1,3,3-tetramethylbutyl)-5'-(α,α-dimethyl benzyl)-phenyl]benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Benzoates, for example 4-tert-butyl-phenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, such as α-cyanoacrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxy-cinnamate, methyl α-carbomethoxy-p-methoxycinnamate, N—(β-carbomethoxy-β-cyanovinyl)-2-methylindoline, neopentyl tetra(α-cyano-β,β-diphenylacrylate.

2.5. Nickel compounds, for example nickel complexes of 2,2'-thio-bis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenylundecylketoxime, nickel complexes of 1-phenyl-4-lauroyl-5-hydroxypyrazole, with or without additional ligands.

2.6. Sterically hindered amine stabilizers, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl) nitrilotriacetate, tetrakis(2,2,6,6-tetramethyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethyl piperidyl)-2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl) pyrrolidine-2,5-dione, a mixture of 4-hexadecyloxy- and 4-stearyloxy-2,2,6,6-tetramethylpiperidine, a condensate of N,N'-bis(2,2,6,6-tetramethyl-4-piperidyl)hexamethylenediamine and 4-cyclohexylamino-2,6-dichloro-1,3,5-triazine, a condensate of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); a condensate of 1,6-hexanediamine and 2,4,6-trichloro-1,3,5-triazine as well as N,N-dibutylamine and 4-butylamino-2,2,6,6-tetramethylpiperidine (CAS Reg. No. [192268-64-7]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxo-spiro[4,5]decane, a reaction product of 7,7,9,9-tetramethyl-2-cycloundecyl-1-oxa-3,8-diaza-4-oxospiro-[4,5]decane and epichlorohydrin, 1,1-bis(1,2,2,6,6-pentamethyl-4-piperidyloxycarbonyl)-2-(4-methoxyphenyl)ethene, N N'-bis-formyl-N,N'-bis(2,2,6,6-tetramethyl-4-piperidyl)hexamethylenediamine, a diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, a reaction product of maleic acid anhydride-α-olefin copolymer with 2,2,6,6-tetramethyl-4-aminopiperidine or 1,2,2,6,6-pentamethyl-4-aminopiperidine, 2,4-bis[N-(1-cyclohexyloxy-2,2,6,6-tetramethylpiperidine-4-yl)-N-butylamino]-6-(2-hydroxyethyl)amino-1,3,5-triazine, 1-(2-hydroxy-2-methylpropoxy)-4-octadecanoyloxy-2,2,6,6-tetramethylpiperidine, 5-(2-ethylhexanoyl)-oxymethyl-3,3,5-trimethyl-2-morpholinone, SANDUVOR® (Clariant; CAS Reg. No. 106917-31-1], 5-(2-ethylhexanoyl)oxymethyl-3,3,5-trimethyl-2-morpholinone, the reaction product of 2,4-bis[(1-cyclohexyloxy-2,2,6,6-piperidine-4-yl)butylamino]-6-chloro-s-triazine with N,N'-bis(3-aminopropyl) ethylenediamine), 1,3,5-tris(N-cyclohexyl-N-(2,2,6,6-tetramethylpiperazine-3-one-4-yl)amino)-s-triazine, 1,3,5-tris(N-cyclohexyl-N-(1,2,2,6,6-pentamethylpiperazine-3-one-4-yl)amino)-s-triazine.

2.7. Oxanilides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8. s-Triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)

phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine, 2,4-bis(4-[2-ethylhexyloxy]-2-hydroxyphenyl)-6-(4-methoxyphenyl)-1,3,5-triazine.

3. Metal deactivators, for example N,N'-diphenyloxamide, N-salicylal-N'-salicyloyl hydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenyl hydrazide, N,N'-diacetyladipoyl dihydrazide, N,N'-bis(salicyloyl)oxalyl dihydrazide, N,N'-bis(salicyloyl)thiopropionyl dihydrazide.

4. Phosphites and phosphonites, for example triphenyl phosphite, diphenylalkyl phosphites, phenyldialkyl phosphites, tris(nonylphenyl) phosphite, trilauryl phosphite, trioctadecyl phosphite, distearylpentaerythritol diphosphite, tris(2,4-di-tert-butylphenyl) phosphite, diisodecyl pentaerythritol diphosphite, bis(2,4-di-tert-butylphenyl)pentaerythritol diphosphite, bis(2,4-di-cumylphenyl)pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)-pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 6-fluoro-2,4,8,10-tetra-tert-butyl-12-methyl-dibenz[d,g]-1,3,2-dioxaphosphocin, 2,2',2"-nitrilo-[triethyltris(3,3',5,5'-tetra-tert-butyl-1,1'-biphenyl-2,2'-diyl)phosphite], 2-ethylhexyl(3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane.

The following phosphites are especially preferred:

Tris(2,4-di-tert-butylphenyl) phosphite (Irgafos®168, Ciba Specialty Chemicals Inc.), tris(nonylphenyl) phosphite,

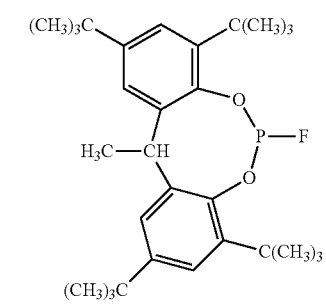

(A)

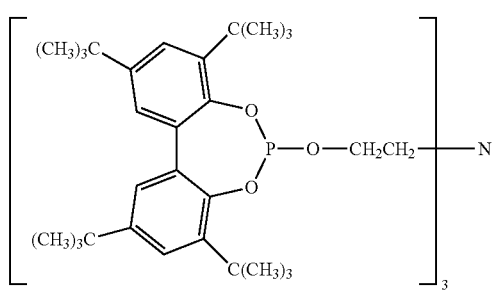

(B)

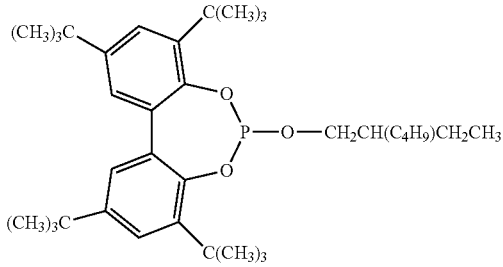

(C)

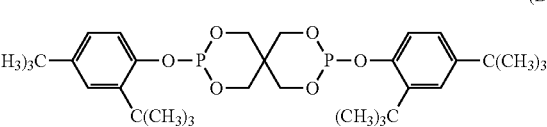

(D)

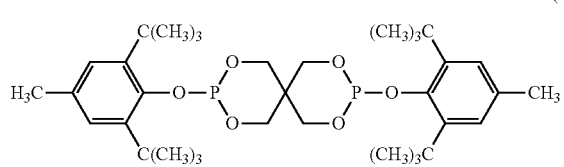

(E)

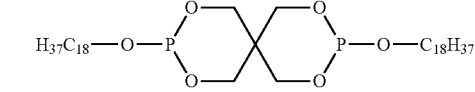

(F)

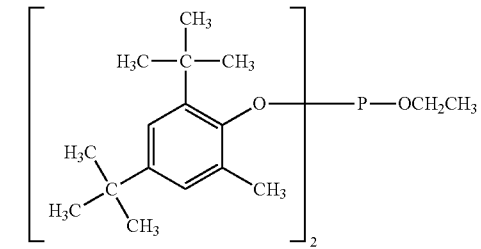

(G)

5. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkyl hydroxylamine derived from hydrogenated tallow amine.

6. Nitrones, for example, N-benzyl-alpha-phenylnitrone, N-ethyl-alpha-methylnitrone, N-octyl-alpha-heptyinitrone, N-lauryl-alpha-undecylnitrone, N-tetradecyl-alpha-tridecylnnitrone, N-hexadecyl-alpha-pentadecylnitrone, N-octadecyl-alpha-heptadecylnitrone, N-hexadecyl-alpha-heptadecylnitrone, N-ocatadecyl-alpha-pentadecylnitrone, N-heptadecyl-alpha-heptadecylnitrone, N-octadecyl-alpha-hexadecyl nitrone, nitrone derived from N N-dialkylhydroxylamine derived from hydrogenated tallow amine.

7. Thiosynergists, for example dilauryl thiodipropionate, dimistryl thiodipropionate, distearyl thiodipropionate or distearyl disulfide.

8. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

9. Polyamide stabilizers, for example copper salts in combination with iodides and/or phosphorus compounds and salts of divalent manganese.
10. Basic co-stabilizers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate.
11. Nucleating agents, for example inorganic substances, such as talcum, metal oxides, such as titanium dioxide or magnesium oxide, phosphates, carbonates or sulfates of, preferably, alkaline earth metals; organic compounds, such as mono- or polycarboxylic acids and the salts thereof, e.g. 4-tert-butylbenzoic acid, adipic acid, diphenylacetic acid, sodium succinate or sodium benzoate; polymeric compounds, such as ionic copolymers (ionomers). Especially preferred are 1,3:2,4-bis(3',4'-dimethyl benzylidene)sorbitol, 1,3:2,4-di(paramethyl-dibenzylidene)sorbitol, and 1,3:2,4-di(benzylidene)sorbitol.
12. Fillers and reinforcing agents, for example calcium carbonate, silicates, glass fibres, glass beads, asbestos, talc, kaolin, mica, barium sulfate, metal oxides and hydroxides, carbon black, graphite, wood flour and flours or fibers of other natural products, synthetic fibers.
13. Other additives, for example plasticisers, lubricants, emulsifiers, pigments, rheology additives, catalysts, flow-control agents, optical brighteners, flameproofing agents, antistatic agents and blowing agents.
14. Benzofuranones and indolinones, for example those disclosed in U.S. Pat. No. 4,325,863; U.S. Pat. No. 4,338,244; U.S. Pat. No. 5,175,312; U.S. Pat. No. 5,216,052; U.S. Pat. No. 5,252,643; DE-A-4316611; DE-A-4316622; DE-A-4316876; EP-A-0589839, EP-A-0591102; EP-A-1291384 or 3-[4-(2-acetoxyethoxy)phenyl]-5,7-di-tert-butylbenzofuran-2-one, 5,7-di-tert-butyl-3-[4-(2-stearoyloxy-ethoxy)phenyl]benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butylbenzofuran-2-one, 3-(3,5-dimethyl-4-pivaloyloxyphenyl)-5,7-di-tert-butylbenzofuran-2-one, 3-(3,4-dimethyl phenyl)-5,7-di-tert-butyl benzofuran-2-one, 3-(2,3-dimethylphenyl)-5,7-di-tert-butylbenzofuran-2-one, 3-(2-acetyl-5-isooctylphenyl)-5-isooctylbenzofuran-2-one.

Preferably, the further additives are phenolic and/or aminic antioxidants, sterically hindered amine stabilizers, UV-absorbers different from the compounds (1), phosphites, phosphonites, benzofuranones, metal stearates, metal oxides, pigments, dyes, organophsophorus compounds, hydroxylamines and/or flame retardants.

Most preferably, the further additives are sterically hindered amine stabilizers and/or UV absorbers selected from the group consisting of the oxanilides, the hydroxybenzophenones, benzoates, the α-cyanoacrylates, the benzotriazoles and the s-triazines different from the compounds (1).

When additional UV-absorbers are added, they are preferably added in an amount from 0.1% to 30%, more preferably from 0.5% to 15% and most preferably from 1% to 10% by weight, based on the weight of the organic material. For instance, these preferences apply for coatings, coating compositions and recording material. For example, in polymer compositions, the additional UV-absorbers are added in amounts from 0.1% to 10%, preferably from 0.1 to 5%, especially 0.1 to 2%, based on the weight of the organic material.

When a sterically hindered amine stabilizer is additionally added, it is preferably added in an amount from 0.1% to 10%, more preferably from 0.5% to 5% and most preferably from 1% to 3% by weight, based on the weight of the organic material. For example, these preferences apply for coatings, coating compositions and recording material. For instance in polymer compositions, the amount of the sterically hindered amine stabilizer is from 0.1 to 5%, preferably from 0.1 to 2%, in particular from 0.1 to 0.5% based on the weight of the organic material.

The total amount of UV-absorber compound (1) and other UV-absorbers and/or sterically hindered amine stabilizer is for example from 0.5% to 15% by weight, based on the weight of the organic material.

Examples for the sterically hindered amine stabilizers and UV-absorbers of the different classes are given above.

Particularly preferred UV-absorbers are the following s-triazines and benzotriazoles:

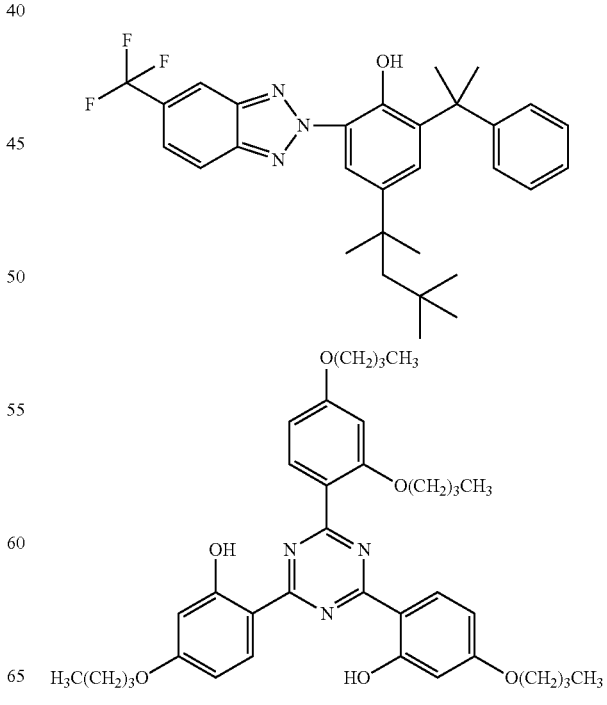

19
-continued
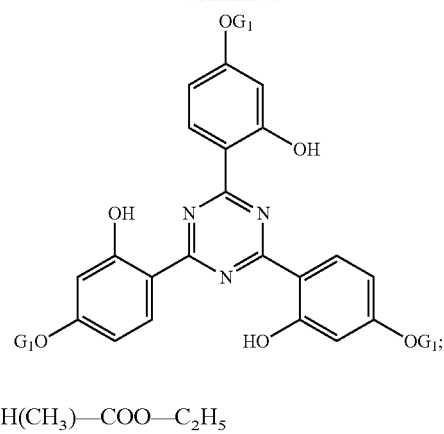
G1=CH(CH₃)—COO—C₂H₅
20
-continued
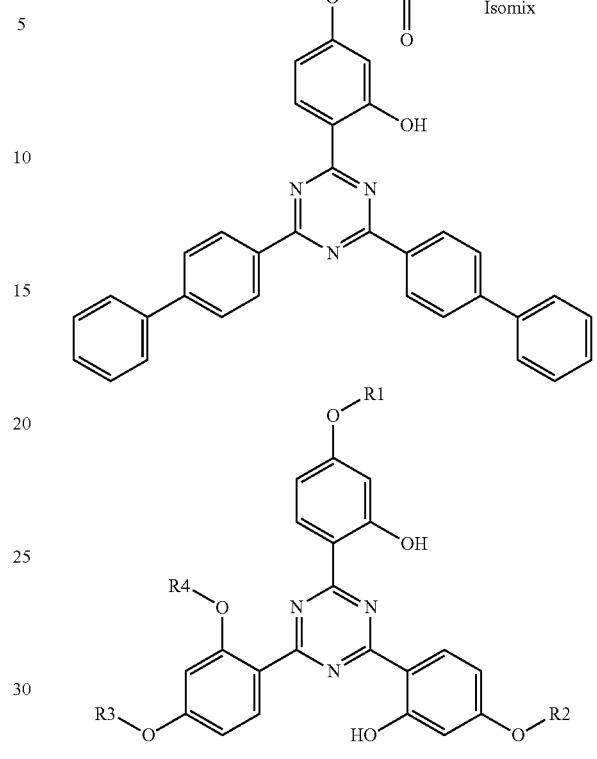
= a mixture of
R1=R2=CH(CH₃)—COO—C₈H₁₇, R3=R4=H;
R1=R2=R3=CH(CH₃)—COO—C₈H₁₇, R4=H;
R1=R2=R3=R4=CH(CH₃)—COO—C₈H₁₇
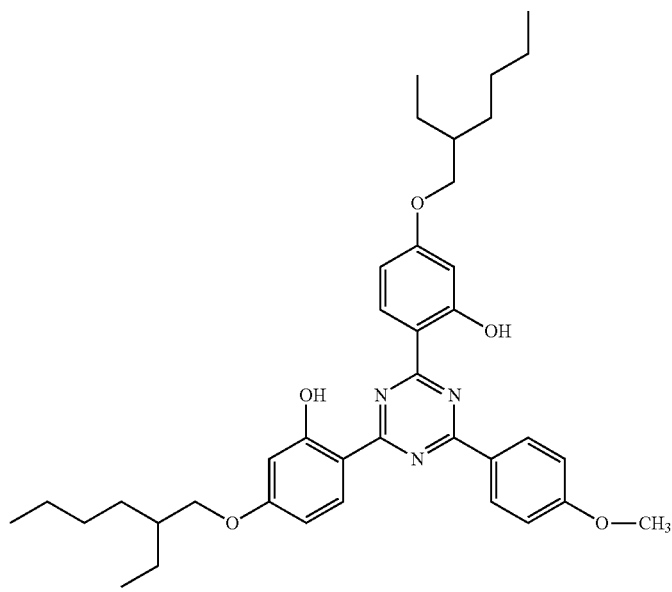

-continued

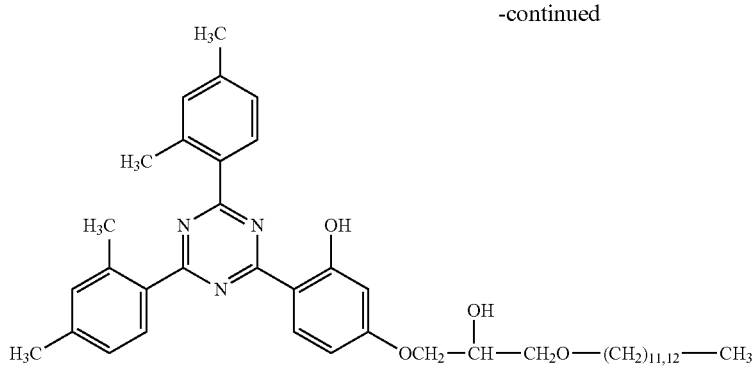

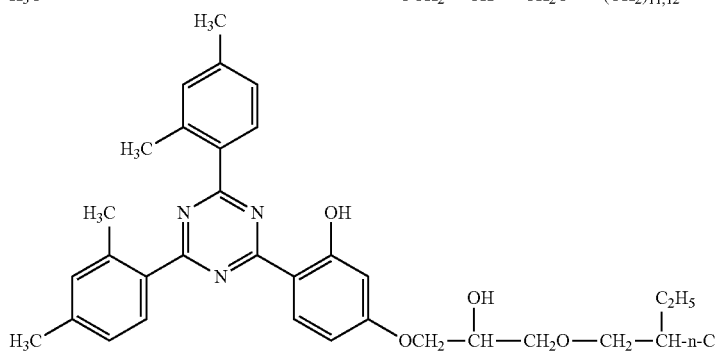

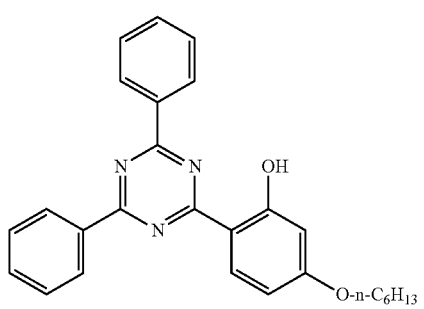

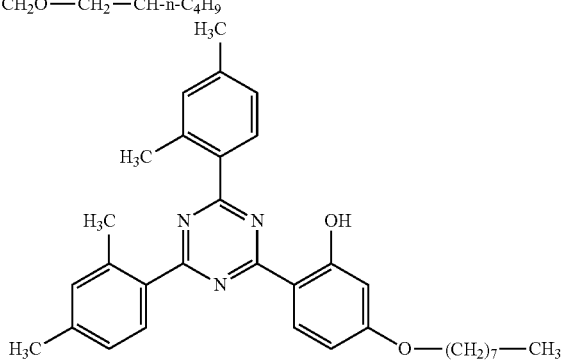

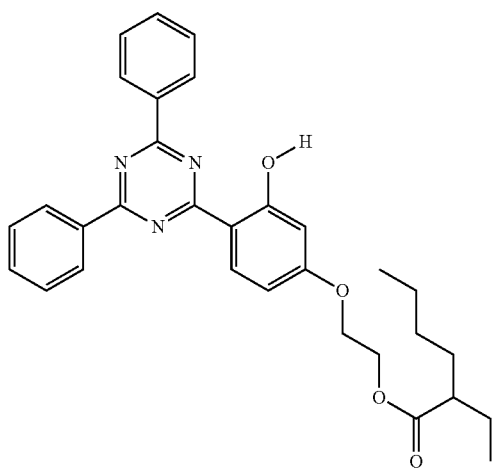

The hydroxyphenyl triazine UV-absorbers are known and are partially items of commerce.

The most suitable benzotriazole UV-absorbers are commercially available under the Trade Names TINUVIN® 384, TINUVIN® 928, TINUVIN® 900, TINUVIN® 328 and TINUVIN® 1130.

Preferred oxanilide UV-absorbers include SANDUVOR® VSU and SANDUVOR® 3206.

Preferred hydroxybenzophenones include CHIMASSORB® 81 and UVINUL® 3049.

The sterically hindered amine stabilizers are preferably selected from the group consisting of the following commercial products:

DASTIB® 845, TINUVIN® 770, TINUVIN® 765, TINUVIN® 144, TINUVIN® 123, TINUVIN® 111, TINUVIN® 783, TINUVIN® 791, TINUVIN® 123, TINUVIN® 292, TINUVIN® 152, TINUVIN® 144, MARK® LA 52, MARK® LA 57, MARK® LA 62, MARK® LA 67, HOSTAVIN® N 20, HOSTAVIN® N 24, SANDUVOR® 3050, SANDUVOR® 3058, DIACETAM® 5, SUMISORB® TM 61, UVINUL® 4049, SANDUVOR® PR 31, GOODRITE® UV 3034, GOODRITE® UV 3150, GOODRITE® UV 3159, GOODRITE® 3110×128, UVINUL® 4050H, CHIMASSORB® 944, CHIMASSORB® 2020, CYASORB® UV 3346, CYASORB® UV 3529, DASTIB® 1082, CHIMASSORB® 119, UVASIL® 299, UVASIL® 125, UVASIL® 2000, UVINUL® 5050H, LICHTSCHUTZSTOFF® UV 31, LUCHEM® HA B 18, MARK® LA 63, MARK® LA 68, UVASORB® HA 88, TINUVIN® 622, HOSTAVIN® N 30 and FERRO® AM 806.

Particularly preferred are TINUVIN® 770, TINUVIN® 292, TINUVIN® 123, TINUVIN® 144, TINUVIN® 152 and SANDUVOR® 3058.

Of interest is a composition, wherein the organic material is a recording material.

The recording materials according to the invention are suitable for pressure-sensitive copying systems, photocopying systems using microcapsules, heat-sensitive copying systems, photographic materials and ink jet printing.

The recording materials according to the invention are distinguished by an unexpected improvement in quality, especially with regard to the fastness to light.

The recording materials according to the invention have the construction known for the particular use. They consist of a customary carrier, for example paper or plastic film, which has been coated with one or more layers. Depending on the type of the material, these layers contain the appropriate necessary components, in the case of photographic materials, for example, silver halide emulsions, dye couplers, dyes and the like. Material particularly suitable for ink jet printing has a layer particularly absorptive for ink on a customary carrier. Uncoated paper can also be employed for ink jet printing. In this case the paper acts at the same time as the carrier material and as the ink-absorbent layer. Suitable material for ink jet printing is, for example, described in U.S. Pat. No. 5,073,448.

The recording material can also be transparent, as, for example, in the case of projection films.

The instant compounds (1) can be incorporated into the carder material as early as the production of the latter, in the production of paper, for example, by being added to the paper pulp. A second method of application is to spray the carder material with an aqueous solution of instant compounds (1) or to add the instant compounds (1) to the coating composition.

Coating compositions intended for transparent recording materials suitable for projection cannot contain any particles which scatter light, such as pigments and fillers.

The dye-binding coating composition can contain a number of other additives, for example antioxidants, light stabilizers (including also UV absorbers which do not belong to the UV absorbers according to the invention), viscosity improvers, fluorescent brighteners, biocides and/or antistatic agents.

The coating composition is usually prepared as follows: the water-soluble components, for example the binder, are dissolved in water and stirred together. The solid components, for example fillers and other additives already described, are dispersed in this aqueous medium. Dispersion is advantageously carded out by means of devices, for example ultrasonic samples, turbine stirrers, homogenizers, colloid mills, bead mills, sand mills, high-speed stirrers and the like. The compounds (1) can be incorporated easily into the coating composition.

The recording material according to this invention preferably contains 1 to 5000 mg/m$^2$, in particular 50-1200 mg/m$^2$, of an instant compound (1).

As already mentioned, the recording materials according to the invention embrace a wide field. The instant compounds (1) can, for example, be employed in pressure-sensitive copying systems. They can be introduced either into the paper in order to protect the microencapsulated dye precursors there from light, or into the binder of the developer layer in order to protect the dyes formed there.

Photocopying systems using light-sensitive microcapsules which are developed by means of pressure are described in U.S. Pat. Nos. 4,416,966; 4,483,912; 4,352,200; 4,535,050; 4,5365,463; 4,551,407; 4,562,137 and 4,608,330, also in EP-A 139,479; EP-A 162,664; EP-A 164,931; EP-A 237,024; EP-A 237,025 or EP-A 260,129. In all these systems the compounds can be put into the dye-receiving layer. The compounds can, however, also be put into the donor layer in order to protect the colour formers from light.

Photographic materials which can be stabilized are photographic dyes and layers containing such dyes or precursors thereof, for example photographic paper and films. Suitable materials are, for example, described in U.S. Pat. No. 5,364,749. The instant compounds act here as a UV filter against electrostatic flashes. In colour photographic materials couplers and dyes are also protected against photochemical decomposition.

The instant compounds (1) can be used for all types of colour photographic materials. For example, they can be employed for colour paper, colour reversal paper, direct-positive colour material, colour negative film, colour positive film, colour reversal film, etc. They are preferably used, inter alia, for photographic colour material which contains a reversal substrate or forms positives.

Colour-photographic recording materials usually contain, on a support, a blue-sensitive and/or a green-sensitive and/or a red-sensitive silver-halide emulsion layer and, if desired, a protection layer, the compounds being, preferably, either in the green-sensitive or the red-sensitive layer or in a layer between the green-sensitive and the red-sensitive layer or in a layer on top of the silver-halide emulsion layers.

The instant compounds (1) can also be employed in recording materials based on the principles of photopolymerization, photoplasticization or the rupture of microcapsules, or in cases where heat-sensitive and light-sensitive diazonium salts, leuko dyes having an oxidizing agent or dye lactones having Lewis acids are used.

Furthermore, they can be employed in recording materials for dye diffusion transfer printing, thermal wax transfer printing and dot matrix printing and for use with electrostatic, electrographic, electrophoretic, magnetographic and laser-electrophotographic printers and pen-plotters. Of the above, recording materials for dye diffusion transfer printing are preferred as, for example described in EP-A-507,734.

They can also be employed in inks, preferably for ink jet printing, as, for example, further described in U.S. Pat. No. 5,098,477.

Of further interest is a composition, wherein the organic material is a natural, semi-synthetic or synthetic polymer, especially a thermoplastic polymer.

Examples of such polymers are given below.

1. Polymers of monoolefins and diolefins, for example polypropylene, polyisobutylene, polybut-1-ene, poly-4-methylpent-1-ene, polyvinylcyclohexane, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different, and especially by the following, methods:
 a) radical polymerisation (normally under high pressure and at elevated temperature).
 b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene like COC), ethylene/1-olefins copolymers, where the 1-olefin is gene-rated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

4. Hydrocarbon resins (for example $C_5$-$C_9$) including hydrogenated modifications thereof (e.g. tackifiers) and mixtures of polyalkylenes and starch.

Homopolymers and copolymers from 1.)-4.) may have any stereostructure including syndiotactic, isotactic, hemi-isotactic or atactic; where atactic polymers are preferred. Stereoblock polymers are also included.

5. Polystyrene, poly(p-methylstyrene), poly(α-methylstyrene).

6. Aromatic homopolymers and copolymers derived from vinyl aromatic monomers including styrene, α-methylstyrene, all isomers of vinyl toluene, especially p-vinyltoluene, all isomers of ethyl styrene, propyl styrene, vinyl biphenyl, vinyl naphthalene, and vinyl anthracene, and mixtures thereof. Homopolymers and copolymers may have any stereostructure including syndiotactic, isotactic, hemi-isotactic or atactic; where atactic polymers are preferred. Stereoblock polymers are also included.

6a. Copolymers including aforementioned vinyl aromatic monomers and comonomers selected from ethylene, propylene, dienes, nitriles, acids, maleic anhydrides, maleimides, vinyl acetate and vinyl chloride or acrylic derivatives and mixtures thereof, for example styrene/butadiene, styrene/acrylonitrile, styrene/ethylene (interpolymers), styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

6b. Hydrogenated aromatic polymers derived from hydrogenation of polymers mentioned under 6.), especially including polycyclohexylethylene (PCHE) prepared by hydrogenating atactic polystyrene, often referred to as polyvinylcyclohexane (PVCH).

6c. Hydrogenated aromatic polymers derived from hydrogenation of polymers mentioned under 6a.).

Homopolymers and copolymers may have any stereostructure including syndiotactic, isotactic, hemi-isotactic or atactic; where atactic polymers are preferred. Stereoblock polymers are also included.

7. Graft copolymers of vinyl aromatic monomers such as styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulfo-chlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from α,β-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxymethylenes which contain ethylene oxide as a comonomer; polyacetals modified with thermoplastic polyurethanes, acrylates or MBS.

14. Polyphenylene oxides and sulfides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

17. Polyureas, polyimides, polyamide-imides, polyetherimids, polyesterimids, polyhydantoins and polybenzimidazoles.

18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate, polyalkylene naphthalate (PAN) and polyhydroxybenzoates, as well as block copolyether esters derived from hydroxyl-terminated polyethers; and also polyesters modified with polycarbonates or MBS.

19. Polycarbonates and polyester carbonates.

20. Polyketones.

21. Polysulfones, polyether sulfones and polyether ketones.

22. Crosslinked polymers derived from aldehydes on the one hand and phenols, ureas and melamines on the other hand, such as phenol/formaldehyde resins, urea/formaldehyde resins and melamine/formaldehyde resins.

23. Drying and non-drying alkyd resins.

24. Unsaturated polyester resins derived from copolyesters of saturated and unsaturated dicarboxylic acids with polyhydric alcohols and vinyl compounds as crosslinking agents, and also halogen-containing modifications thereof of low flammability.

25. Crosslinkable acrylic resins derived from substituted acrylates, for example epoxy acrylates, urethane acrylates or polyester acrylates.

26. Alkyd resins, polyester resins and acrylate resins crosslinked with melamine resins, urea resins, isocyanates, isocyanurates, polyisocyanates or epoxy resins.

27. Crosslinked epoxy resins derived from aliphatic, cycloaliphatic, heterocyclic or aromatic glycidyl compounds, e.g. products of diglycidyl ethers of bisphenol A and bisphenol F, which are crosslinked with customary hardeners such as anhydrides or amines, with or without accelerators.

28. Natural polymers such as cellulose, rubber, gelatin and chemically modified homologous derivatives thereof, for example cellulose acetates, cellulose propionates and cellulose butyrates, or the cellulose ethers such as methyl cellulose; as well as rosins and their derivatives.

29. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

Of interest is the use of the instant compounds (1) as stabilizers in synthetic organic polymers, for example a coating or a bulk polymer or article formed therefrom, especially in thermoplastic polymers and corresponding compositions as well as in coating compositions, for example in acid or metal catalyzed coating compositions.

In general the instant compounds (1) are added to the organic polymer to be stabilized in amounts of from 0.01 to 10%, preferably from 0.01 to 5%, in particular from 0.01 to 2% (based on the organic polymer to be stabilized). Particular preference is given to the use of the instant compounds in amounts of from 0.05 to 1.5%, especially from 0.1 to 0.5%.

Incorporation into the organic polymers can be effected, for example, by mixing in or applying the instant compounds (1) and, if desired, further additives by the methods which are customary in the art. The incorporation can take place prior to or during the shaping operation, or by applying the dissolved or dispersed compound to the polymer, with or without subsequent evaporation of the solvent. In the case of elastomers, these can also be stabilized as latices. A further possibility for incorporating the instant compounds (1) into polymers is to add them before, during or directly after the polymerization of the corresponding monomers or prior to crosslinking. In this context the instant compounds can be added as it is or else in encapsulated form (for example in waxes, oils or polymers).

The instant compounds (1) can also be added in the form of a masterbatch containing said compound in a concentration, for example, of from 2.5 to 25% by weight to the polymers that are to be stabilized.

The instant compounds (1) can judiciously be incorporated by the following methods:

as emulsion or dispersion (e.g. to latices or emulsion polymers), as a dry mixture during the mixing in of additional components or polymer mixtures, by direct introduction into the processing apparatus (e.g. extruders, internal mixers, etc), as solution or melt.

Novel polymer compositions can be employed in various forms and/or processed to give various products, for example as (to give) films, fibres, tapes, moulding compositions, profiles, or as binders for coating materials, adhesives or putties.

For instance in the instant composition, the instant compound (1) is present in an amount of from 0.1% to 30% by weight, preferably from 0.5% to 15% and most preferably from 1% to 10% by weight, based on the weight of the organic material. These concentrations are of particular interest for organic material that is a coating composition or a coating or a recording material. The preferred concentrations for polymer compositions are given above.

A further aspect of the instant invention is a process for the stabilization of an organic material against the deleterious influence of UV and/or visible light, which comprises admixing and/or applying to said material as stabilizer an instant compound (1).

Another aspect of the instant invention is the use of an instant compound (1) as ultraviolet (UV) and visible (VIS) light absorber in an organic material.

Percentages are weight percentages unless otherwise stated.

The following examples illustrate the invention.

EXAMPLES

All reactions are performed under inert and dry conditions unless otherwise stated.

Abbreviations:

$^1$H-NMR: Bruker 300/400 MHz (CDCl$_3$, DMSO-d$^6$)

RT: room temperature mp: melting point (° C.)

ε: extinction coefficient in l·mol$^{-1}$·cm$^{-1}$ $\lambda_{max}$: absorption maximum in nm Commercial stabilizers used in the application examples:

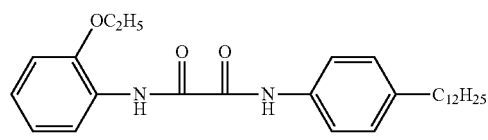

(CAS-no 82493-14-9)

SANDUVOR® 3206

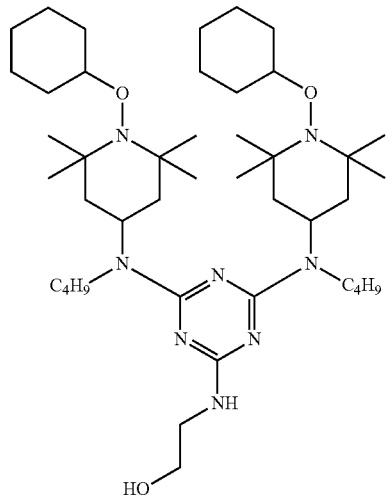

TINUVIN® 152

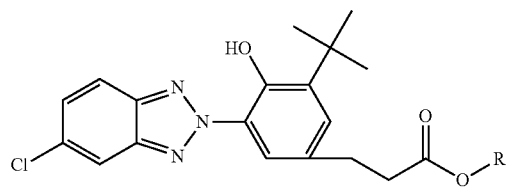
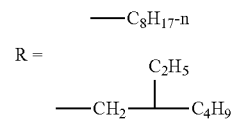

TINUVIN® 109

-continued

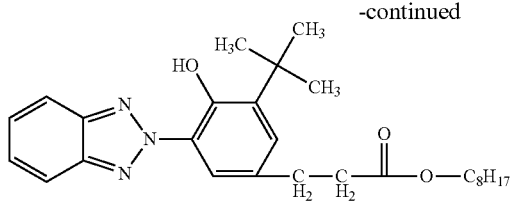

TINUVIN® 384

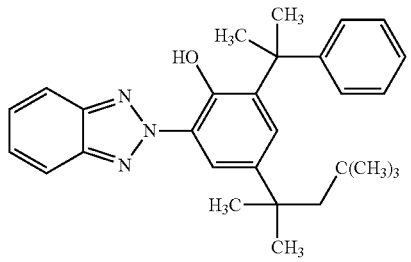

TINUVIN® 928

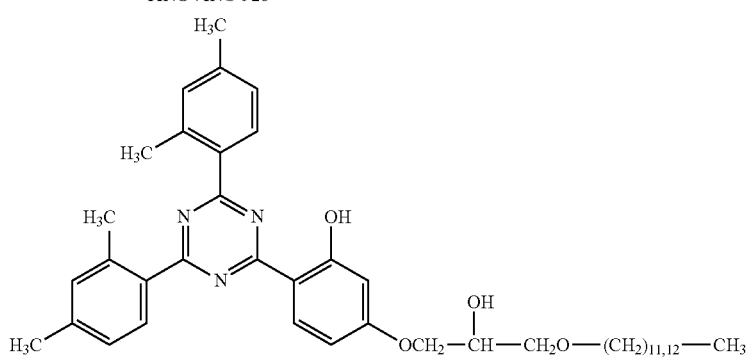

TINUVIN® 400

Example 1: Preparation of Starting Material

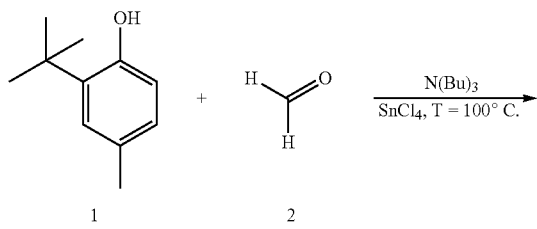

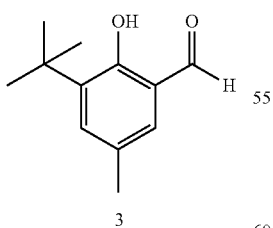

328.5 g (2 mol) 1 are dissolved in 2600 g toluene. The solution is cooled to a temperature of 15° C. and 148.3 g tributyl-amine (0.8 mol) and 52.1 g SnCl$_4$ (0.2 mol) are added stepwise and in portions to this solution. The reaction mixture is stirred for 30 minutes at T=25° C. and then 132 g paraformaldehyde 2 (4.4 mol) are added. The yellow reaction mixture is heated up to T=130° C. for a time period of 10 hours. The reaction mixture is cooled down to room temperature and hydrolyzed in a water/ice mixture with 150 ml HCl (32%). The product is extracted with ethyl acetate, the water phase is saturated with NaCl. The ethyl acetate extract is dried over MgSO$_4$ and the solvent is distilled off. The residue is distilled under vacuum (p=0.5 torr) and the product distilled with a head temperature of 85-90° C. The product is recrystallised from diethyl ether at T=−20° C. and 204 g product 3 are obtained with a yield of 53.1% (mp: 64-73° C.).

Example 2: Preparation of Starting Material

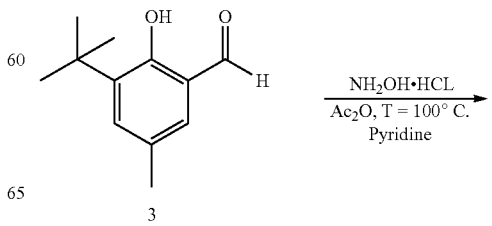

Example 4

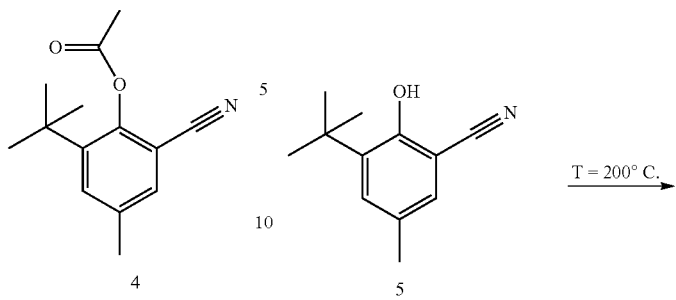

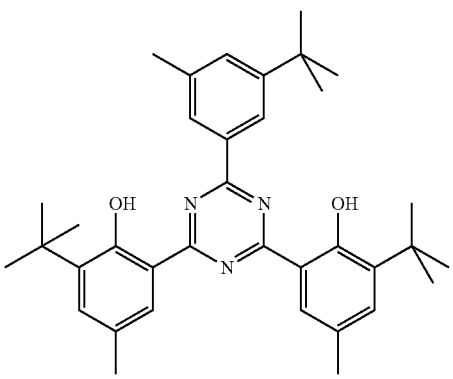

14.4 g (0.21 mol) of hydroxyl amine are dissolved in 60 ml pyridine and the solution is cooled down to a temperature of T=0-5° C. 30 g (0.156 mol) 3 are added in portions and the reaction mixture is kept at T=0-5° C. and is turning into an orange color and a slight exothermic is observed. The mixture is kept for another 2 hours at T=0-5° C. and then 145.1 g (0.72 mol) of acetic acid anhydride is added in portions in a time period of 30 minutes, while the temperature is kept below T=20° C. The reaction mixture is heated up to a temperature of T=100-105° C. for a time period of 3 hours and the reaction mixture is cooled down to RT and is hydrolyzed in an ice mixture. The solid product 4 is filtered and washed with water and finally dried in a vacuum oven at T=35° C. Product 4 is obtained in 97% yield (mp: 64-69° C.).

Example 3: Preparation of Starting Material

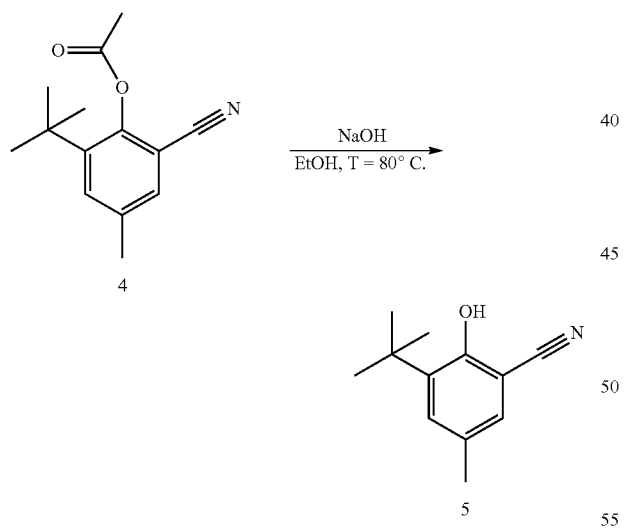

30 g (0.13 mol) 4 are dissolved in 50 ml ethanol. The solution is added drop wise to a mixture of 6.7 g (0.17 mol) NaOH dissolved in 70 ml water at a temperature of T=80° C. The reaction mixture is kept for 8 hours at T=80° C. and then cooled to RT. The reaction mixture is then acidified by addition of 16 g of HCl solution (36.5%) and extracted by addition of 150 ml ethyl acetate. The organic extract is dried over MgSO$_4$ and the solvent is distilled off. The residue is recrystallised from xylene. Product 5 is obtained in form of crystals with 56% yield (mp: 113-117° C.).

10 g intermediate 5 (53 mmol) is heated as a solid to a temperature of T=190 to 215° C. After a time period of 2 hours and 40 minutes the black solid is turning into a violet colored solution and the reaction mixture is cooled down to room temperature. The black solid reaction mass is pulverized and recrystallised from ethyl cellosolve in a refrigerator. After filtration, product 6 is obtained in 32% yield in form of a solid (mp 6: 306-312° C.; m toluene. Product 6 is obtained in form of crystals with a yield of 32%. M.p. 6: 306-312° C.; UV/Vis (CHCl$_3$):

$\lambda_{max}(\varepsilon)$: 298 (56600), 348 (24017)) l/mol·cm.

Example 5: Preparation of Starting Material

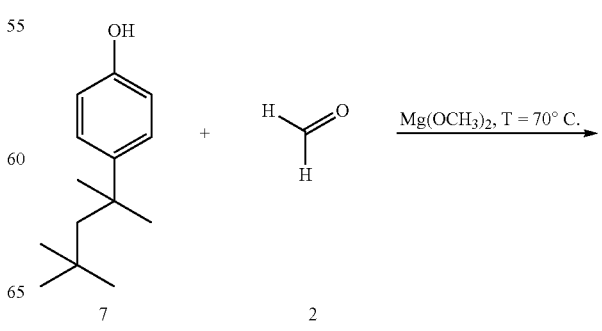

-continued

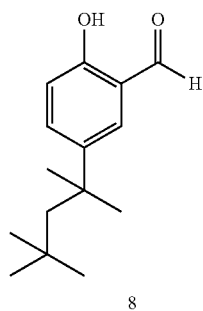

8

7.3 g (0.3 mol) magnesium are dispersed in 150 ml methanol and 50 ml toluene. To this suspension 5 ml of Mg(OCH$_3$)$_2$ (4 mmol, 8% in toluene) are added and the reaction mixture is stirred at a temperature of T=56° C. for a time period of 1 hour. In this time the magnesium metal is completely dissolved in the reaction mixture. 103.2 g (0.5 mol) 7 are added to the solution. A colorless solid is formed after 10 minutes and the reaction mixture is stirred for another 2 hours at T=50° C. Then 400 ml toluene are added and the methanol is distilled out of the reaction mixture and the temperature is raised to T=100° C. 46.4 g (1.5 mol) para-formaldehyde are in 150 ml toluene and the reaction mixture is kept at T=95 to 100° C. for a time period of 45 minutes. The mixture is cooled to RT and hydrolyzed in a mixture of 1.2 kg water and 45 ml H$_2$SO$_4$ (98%) and stirred there for 2 hours. The mixture is the extracted with 500 ml ethyl acetate and the organic extract is washed with 2 times 200 ml saturated NaCl solution. The extract is dried over MgSO$_4$ and the solvent is distilled off. The product is isolated in an overhead distillation under vacuum at a bath temperature of 130-150° C. and a vacuum of 0.6-0.4 torr. 84.1 g of product 8 (boiling point: 105-110° C.) are isolated; this corresponds to a yield of 72%.

Example 6: Preparation of Starting Material

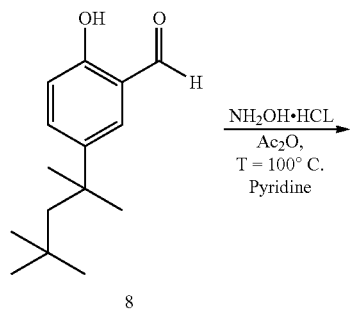

31.5 g (0.45 mol) hydroxyl amine are dissolved in 133 ml pyridine and the solution is cooled down to a temperature of T=0-5° C. 80 g (0.34 mol) 8 are added in portions and the reaction mixture is kept at T=0-5° C. and is turning into a yellow color and a slight exothermic is observed. The mixture is kept for another 2 hours at T=0-5° C. and then 294 g (1.57 mol) of acetic acid anhydride is added in portions in a time period of 40 minutes, while the temperature is kept below T=20° C. The reaction mixture is heated up to a temperature of T=100-105° C. for a time period of 3 hours and the reaction mixture is cooled down to RT. 250 ml ethyl acetate are added and the reaction mixture is hydrolyzed in 200 ml HCl (1 N) and 200 ml water. The organic phase is washed with 3 times 250 ml HCl (1 N) and then with saturated NaCl solution, dried over MgSO$_4$. The solvent is distilled off and the residual oil is dried under vacuum. 92.35 g of product 9 are isolated and its spectral data and elemental analysis corresponds to product 9 (yield: 99%).

Example 7: Preparation of Starting Material

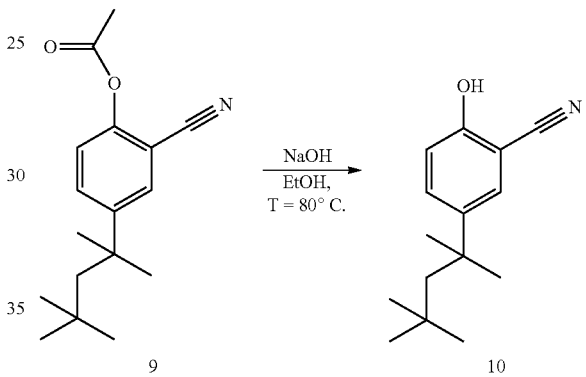

90 g (0.33 mol) 9 are dissolved in 150 ml ethanol. The solution is added drop wise to a mixture of 17.1 g (0.43 mol) NaOH dissolved in 175 ml water at a temperature of T=80° C. The reaction mixture is kept for 8 hours at T=80° C. and then cooled to RT. The reaction mixture is then acidified by addition of 40 ml of HCl solution (36.5%) and extracted by addition of 300 ml ethyl acetate. The organic extract is washed with 2 times 150 ml water and dried over MgSO$_4$ and the solvent is distilled off. The residue is recrystallised from xylene. 42.3 g Product 10 is obtained in form of crystals with 56% yield (mp: 131-133° C.).

Example 8

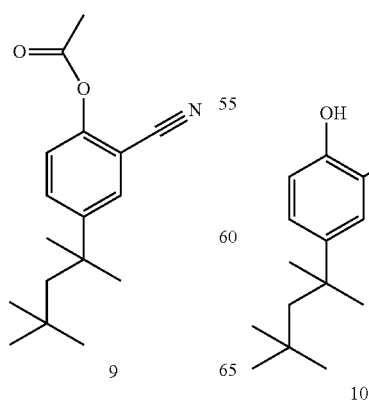

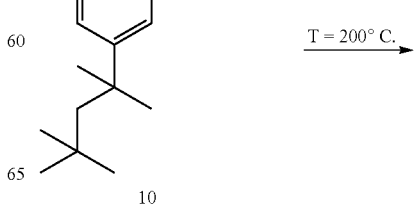

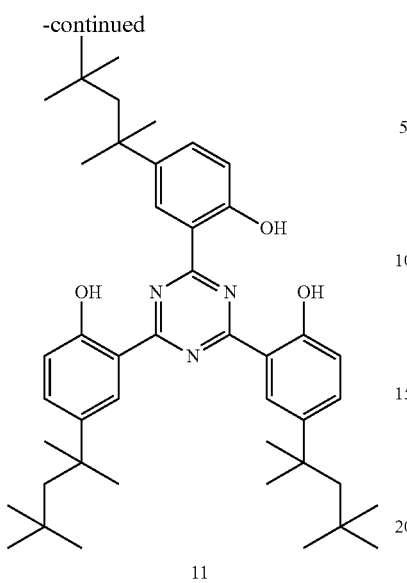

11

15 g intermediate 10 (65 mmol) are heated as a solid to a temperature of T=190 to 215° C. After a time period of 4 hours the solid is turning into an orange colored solution and the reaction mixture is cooled down to room temperature. The solid reaction mass is pulverized and recrystallised from ethyl cellosolve in a refrigerator. After filtration, product 11 is obtained in 48% yield in form of a solid (M.p. 11: 203-207° C.; UV/Vis (CHCl₃): $\lambda_{max}(\epsilon)$: 289 (57250), 372 (21930) l/mol·cm.

Example 9: Preparation of Starting Material

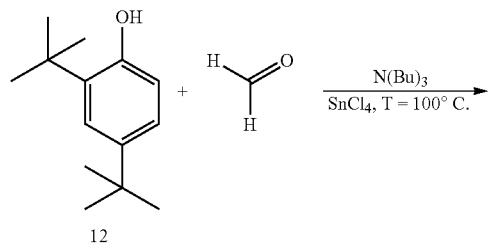

412.7 g (2 mol) 12 are dissolved in 2600 g toluene. The solution is cooled to a temperature of 15° C. and 148.3 g tributyl-amine (0.8 mol) and 52.1 g SnCl₄ (0.2 mol) are added stepwise and in portions to this solution. The reaction mixture is stirred for 30 minutes at T=25° C. and then 132 g paraformaldehyde 2 (4.4 mol) are added. The yellow reaction mixture is heated up to T=100-110° C. for a time period of 14 hours. The reaction mixture is cooled down to room temperature and hydrolyzed in a water/ice mixture with 150 ml HCl (32%). The product is extracted with ethyl acetate, the water phase is saturated with NaCl. The ethyl acetate extract is dried over MgSO₄ and the solvent is distilled off. The residue is distilled under vacuum (p=0.6-0.7 torr) and the product distilled with a head temperature of 105-110° C. The product is recrystallised from diethyl ether at T=−20° C. and 201 g product 13 are obtained with a yield of 43% (mp: 53-57.5° C.).

Example 10: Preparation of Starting Material

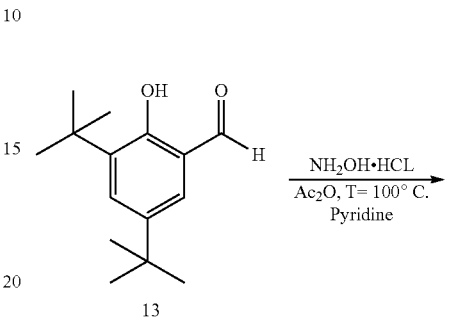

46.3 g (0.66 mol) of hydroxyl amine-hydrochloride are dissolved in 200 ml pyridine and the solution is cooled down to a temperature of T=0-5° C. 117.2 g (0.5 mol) 13 are added in portions and the reaction mixture is kept at T=0-5° C. and is turning into an yellow color, a slight exothermic is observed too. The mixture is kept for another 2 hours at T=0-5° C. and then 430 ml (2.3 mol) of acetic acid anhydride is added in portions in a time period of 55 minutes, while the temperature is kept below T=20° C. The reaction mixture is heated up to a temperature of T=100-105° C. for a time period of 3 hours and the reaction mixture is cooled down to RT and is hydrolyzed in an ice mixture. The solid product 14 is filtered and washed with water and finally dried in a vacuum oven at T=35° C. Product 14 is obtained in 100% yield (mp: 106-109° C.).

Example 11: Preparation of Starting Material

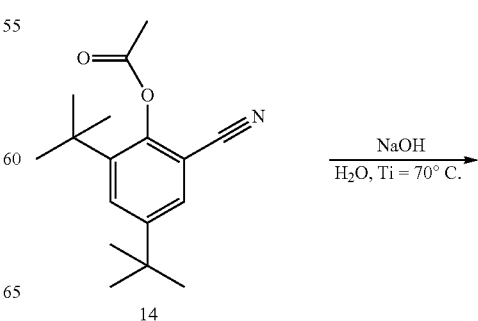

-continued

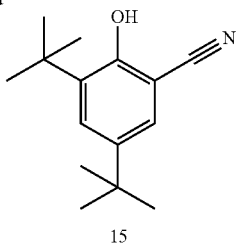
15

30.1 g (0.11 mol) 14 are dissolved in 50 ml ethanol. The solution is added drop wise to a mixture of 9.2 g (0.23 mol) NaOH (dissolved in 50 ml water) at a temperature of T=70° C. The reaction mixture is diluted with 20 ml methanol and kept for 20 hours at T=70° C. and additionally 20 hours under reflux conditions. The reaction mixture is then cooled to RT and the solid product is filtered off and finally dissolved in 300 ml ethyl acetate. The organic phase is acidified by addition of 15 g of HCl solution (36.5%), washed with water and finally dried over MgSO$_4$. The solvent is distilled off and 18.3 g product 15 (yield: 72%) are obtained as solid (mp: 104.5-111° C.).

Example 12

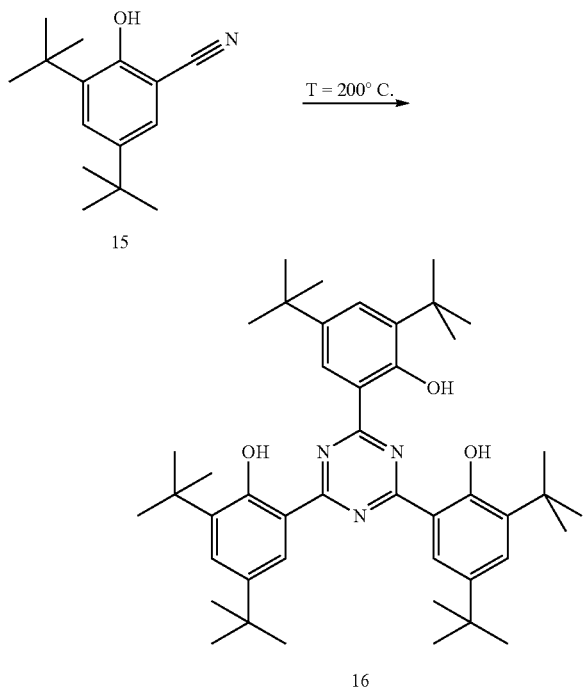

15 g intermediate 15 (65 mmol) are heated as a solid to a temperature of T=190 to 215° C. After a time period of 5 hours the solid is turning into a orange colored solution and the reaction mixture is cooled down to room temperature. The solid reaction mass is pulverized and recrystallised from 400 ml ethyl cellosolve. After filtration, 6.7 g product 16 are obtained in 45% yield in form of a solid (M.p. 16: 324-340° C.; UV/Vis (CHCl$_3$): $\lambda_{max}(\varepsilon)$: 299 (57325), 382 (23320) l/mol·cm.

Application Examples

Example 13: Photo Permanence of Instant UV-Absorbers

The photo permanence of the instant UV-absorbers is evaluated as follows:

The UV-absorbers of the present invention are incorporated into a thermosetting acryl/melamine clear coat (based on Viacryl® SC 303/Viacryl® SC 370/Maprenal® MF 650) in a concentration of 3% based on the solids content of the formulation (solids content: 50.4%). The clear coat is sprayed onto glass plates resulting in a dry film thickness of the clear coat of 20 μm after cure (130° C./30').

Prior to exposure of the specimens, the UV-absorption spectra are recorded using a UV/VIS spectrometer (Perkin Elmer, Lamda 40). Reference: unstabilized acryl/melamine clear coat. Subsequently the specimens are exposed in a Xenon-WOM wetherometer (Atlas Corp.) according to SAE J 1960. The percentage of UV-absorber retained (determined at λ max.) upon exposure is monitored by recording the UV-absorption spectra after regular exposure intervals. The test results are summarized in Table 1:

TABLE 1 photo permanence of instant UV-absorbers during Xe-WOM exposure in comparison to commercial references

| | % UV-absorber retained after . . . hours Xe-WOM exposure | | | | |
|---|---|---|---|---|---|
| Sample | 1000 | 1500 | 2000 | 3000 | 4000 |
| Compound of Example 12 | 100.0 | 96.8 | 91.4 | 85.9 | 70.7 |
| Compound of Example 8 | 100.0 | 98.3 | 96.2 | 88.6 | 87.3 |
| hydroxy-phenyl-benzotriazole [1] | 68.3 | 50.8 | 40.2 | 18.7 | — |
| Hydroxy-phenyl-benzotriazole [2] | 83.0 | n.a. | 68.2 | 43.4 | 33.8 |
| hydroxy-phenyl-triazine [3] | 89.8 | 82.1 | 76.0 | 59.4 | 48.5 |
| oxanilide [4] | 8 | — | — | — | — |

[1] TINUVIN ® 384
[2] TINUVIN ® 928
[3] TINUVIN ® 400
[4] SANDUVOR ® 3206

Example 14

Two subsequent clear coats are applied on top of each other. The first clear coat (Clear coat I) is stabilized and applied as described in greater detail in Example 13. A second thermosetting acryl/melamine clear coat (based on Viacryl® SC 303/Viacryl® SC 370/Maprenal® MF 650) is subsequently sprayed onto the first clear coat resulting in a dry film thickness of the second clear coat (clear coat II) of 40 μm after cure (130° C./30 min). The second clear coat is stabilized using a UV-absorber combination of 3% TINUVIN® 109/1.5% TINUVIN® 400 and 1% TINUVIN® 152 (HALS) as co-stabilizer. Reference: unstabilized first clear coat. As described in Example 13, the UV-transmission spectra are recorded prior to exposure of the specimens using a UV/VIS spectrometer (Perkin Elmer, Lamda 40). Subsequently the specimens are exposed in a Xenon-WOM wetherometer (Atlas Corp.) according to SAE J 1960. The transmission values (determined at 394 nm) as a function of the exposure period are monitored by recording the transmission spectra after regular exposure intervals. The test results are summarized in Table 2:

TABLE 2

Transmission values (determined at 394 nm) as a function exposure intervals during Xe-WOM exposure

| Sample | transmission values (%) after ... hours | | | | |
|---|---|---|---|---|---|
| | initial | 1000 | 2000 | 3000 | 4000 |
| Clear coat I: unstabilized Clear coat II: 3% TINUVIN ® 109/1.5% TINUVIN ® 400 | 24.5 | 24.8 | 27.0 | 27.1 | 27.9 |
| Clear coat I: 3% compound of Example 12 Clear coat II: 3% TINUVIN ® 109/1.5% TINUVIN ® 400 | 0.68 | 0.73 | 0.73 | 0.82 | 1.02 |
| Clear coat I: 3% compound of Example 8 Clear coat II: 3% TINUVIN ® 109/1.5% TINUVIN ® 400 | 0.41 | 0.49 | 0.50 | 0.53 | 0.54 |

Example 15: Adhesion of Clear Coats Applied onto Electro Coats

As described in greater detail in Example 14, two subsequent clear coats layers are applied on top of electrocoated aluminum panels (ED 6950A, 10×30 cm) as commercially available from ACT Laboratories (ACT Laboratories, Inc., Southfield, Mich. 48 075, USA).

References: a) both clear coat layers unstabilized, b) second clear coat stabilized with existing UV-absorber package based on TINUVIN® 109/TINUVIN® 400, i.e. cutting out all UV-light in between 300-385 nm.

Subsequently the specimens are exposed in a Xenon-WOM wetherometer (Atlas Corp.) according to SAE J 1960. The adhesion between the clear coats and the light sensitive electro coat is determined at regular intervals by cross hatch (ISO 2409) followed by tape test. The test results are summarized in Table 3:

TABLE 3

| Sample | Cross hatch value (ISO 2409 after ... hours) | | | |
|---|---|---|---|---|
| | 250 h | 1000 h | 1500 h | 2000 h |
| Clear coat I/II: unstabilized | Gt 5 | — | — | — |
| Clear coat I: unstabilized clear coat II: 3% TINUVIN ® 109/1.5% TINUVIN ® 400 | Gt 0 | Gt 5 | — | — |
| Clear coat I: 3% compound of Example 12 Clear coat II: 3% TINUVIN ® 109/1.5% TINUVIN ® 400 | Gt 0 | Gt 0 | Gt 0 | Gt 1 |
| Clear coat I: 3% compound of Example 8 Clear coat II: 3% TINUVIN ® 109/1.5% TINUVIN ® 400 | Gt 0 | Gt 0 | Gt 1 | Gt 2 |

NOTE:
Gt 0 according to ISO 2409 = best (no loss of adhesion)
Gt 5 = worst (complete delamination)

| Clearcoat formulation: | |
|---|---|
| a) Viacryl SC 303[1] (65% solution in xylene/butanol, 26:9 wt./wt.) | 27.51 g |
| b) Viacryl SC 370[2] (75% in Solvesso 100[3]) | 23.34 g |
| c) Maprenal MF 650[4] (55% in isobutanol) | 27.29 g |
| d) Butylacaetate/butanol (37:8 wt./wt.) | 4.33 g |
| e) Isobutanol | 4.87 g |
| f) Solvesso 150[5] | 2.72 g |
| g) Crystal oil 30[6] | 8.74 g |
| h) Baysilone MA[7] (1% in Solvesso 150) | 1.20 g |
| Total | 100.00 g |

Raw materials:
[1]Viacryl SC 303: acrylic resin (Solutia, formerly Vianova Resins)
[2]Viacryl SC 370: acrylic resin (Solutia, formerly Vianova Resins)
[3]Solvesso 100: aromatic hydrocarbon, bp. 163-180° C. (Exxon Corp.)
[4]Maprenal MF 650: melamine resin (Solutia, formerly Vianova Resins)
[5]Solvesso 150: aromatic hydrocarbon, bp. 180-203° C. (Exxon Corp.)
[6]Crystal oil 30: aliphatic hydrocarbon, bp. 145-200° C. (Shell Corp.)
[7]Baysilone MA: leveling agent (Bayer AG)

The invention claimed is:

1. An automotive coating composition comprising compound of formula (IIa)

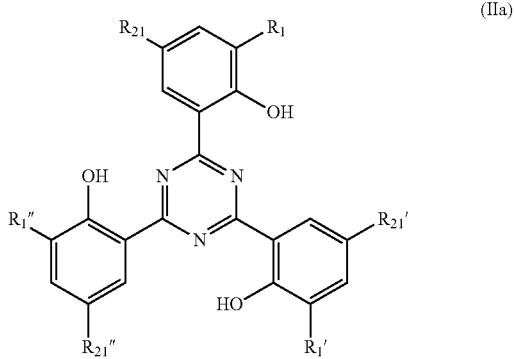

(IIa)

wherein $R_1$, $R_1'$ and $R_1''$ are independently hydrogen, $C_4$-$C_{24}$alkyl, $C_2$-$C_{18}$alkenyl or $C_5$-$C_{12}$cycloalkyl; and $R_{21}$, $R_{21}'$ and $R_{21}''$ are independently $C_4$-$C_{24}$alkyl, $C_2$-$C_{18}$alkenyl or $C_5$-$C_{12}$cycloalkyl.

2. The automotive coating composition according to claim 1, wherein $R_1$, $R_1'$ and $R_1''$ are independently hydrogen or $C_4$-$C_{12}$alkyl; and $R_{21}$, $R_{21}'$ and $R_{21}''$ are independently $C_4$-$C_{12}$alkyl.

3. The automotive coating composition according to claim 1, wherein the compound of formula (IIa) is present in an amount of from 0.1% to 30% by weight, based on the weight of the coating composition.

4. An automotive coating obtained by applying the automotive coating composition of claim 1 on a substrate.

5. The automotive coating according to claim 4, comprising the following layers
   (d) a cathodically deposited coating, adhering to a metal substrate;
   (e) at least one subsequent coating layer containing a compound of formula (IIa) adhering to the cathodically deposited coating; and
   (f) a clear top coating containing one or more UV-absorbers different from those of formula (IIa) and optionally further light stabilizers.

6. The automotive coating according to claim 4 wherein the automotive coating is applied over a substrate, which is sensitive to electromagnetic radiation of wavelengths greater than 380 nm.

7. The automotive coating composition according to claim 1, wherein
   $R_1$, $R_1'$ and $R_1''$ are independently $C_4$-$C_{12}$alkyl; and
   $R_{21}$, $R_{21}'$ and $R_{21}''$ are independently $C_4$-$C_{12}$alkyl.

8. A process for the stabilization of an automotive coating against the deleterious influence of UV and/or visible light, which comprises admixing and/or applying to said automotive coating as stabilizer a compound of formula (IIa) according to claim 1.

9. A process according to claim 8 wherein the automotive coating comprises
   (g) applying a cathodically deposited coating, adhering to a metal substrate
   (h) incorporating into at least one coating adhering to the cathodically deposited coating a compound of formula (IIa); and
   (j) applying a clear top coating over the coating adhering to the cathodically deposited coating, which clear top coating contains one or more UV-absorbers different from those of formula (IIa) and optionally further light stabilizers.

10. An automotive coating composition comprising the following compound

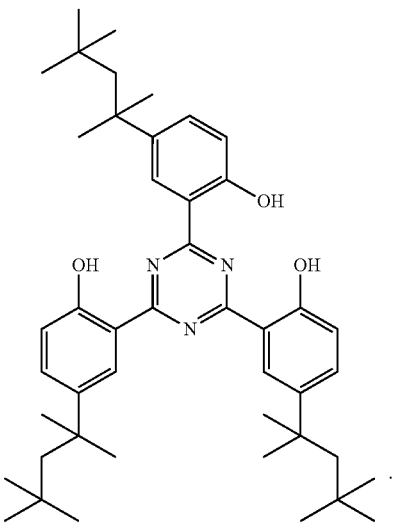 [SMILES: CC(C)(C)CC(C)(C)c1ccc(O)c(-c2nc(-c3cc(C(C)(C)CC(C)(C)C)ccc3O)nc(-c3cc(C(C)(C)CC(C)(C)C)ccc3O)n2)c1]

11. An automotive coating composition comprising the following compound

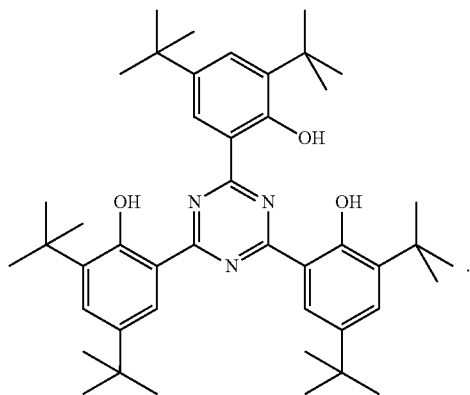 [SMILES: CC(C)(C)c1cc(-c2nc(-c3cc(C(C)(C)C)cc(C(C)(C)C)c3O)nc(-c3cc(C(C)(C)C)cc(C(C)(C)C)c3O)n2)c(O)c(C(C)(C)C)c1]

* * * * *